United States Patent
O'Neill

(10) Patent No.: US 8,279,544 B1
(45) Date of Patent: Oct. 2, 2012

(54) SELECTIVELY ATTACHABLE AND REMOVABLE LENSES FOR COMMUNICATION DEVICES

(75) Inventor: Patrick D O'Neill, Huntington Beach, CA (US)

(73) Assignee: Premier Systems USA, Inc, Huntington Beach, CA (US)

( * ) Notice: Subject to any disclaimer, the term of this patent is extended or adjusted under 35 U.S.C. 154(b) by 0 days.

(21) Appl. No.: 13/366,227

(22) Filed: Feb. 3, 2012

Related U.S. Application Data

(60) Provisional application No. 61/454,136, filed on Mar. 18, 2011, provisional application No. 61/503,835, filed on Jul. 1, 2011, provisional application No. 61/585,857, filed on Jan. 12, 2012.

(51) Int. Cl.
    *G02B 7/02* (2006.01)
(52) U.S. Cl. ........................................ 359/827; 359/819
(58) Field of Classification Search ........... 359/811–827
    See application file for complete search history.

(56) References Cited

U.S. PATENT DOCUMENTS

| | | | |
|---|---|---|---|
| 6,889,006 B2 | 5/2005 | Kobayashi | |
| 7,639,353 B2 * | 12/2009 | Rooke | 356/239.2 |
| 7,967,513 B2 | 6/2011 | Zhang | |
| 2007/0275763 A1 * | 11/2007 | Sawadski et al. | 455/566 |
| 2007/0280677 A1 | 12/2007 | Drake et al. | |
| 2009/0109558 A1 | 4/2009 | Schaefer | |
| 2009/0181727 A1 | 7/2009 | Griffin, Jr. et al. | |
| 2010/0048243 A1 * | 2/2010 | Fourquin et al. | 455/556.1 |
| 2010/0328420 A1 | 12/2010 | Roman | |
| 2011/0110654 A1 | 5/2011 | Maki | |

FOREIGN PATENT DOCUMENTS

| | | |
|---|---|---|
| JP | 2006-251150 | 9/2006 |
| JP | 2007-206137 | 8/2007 |
| WO | WO 2006/002674 | 1/2006 |

OTHER PUBLICATIONS

Amazon.com: Fish Eye lens + Wide Angle Lens + Macro Lens 3-in-1 Kit for iPod iPhone 4G, Dec. 26, 2011.

* cited by examiner

*Primary Examiner* — Mohammed Hasan
(74) *Attorney, Agent, or Firm* — Knobbe Martens Olson & Bear LLP

(57) ABSTRACT

Some embodiments disclosed herein relate to a lens component having one or more lenses attached to a retainer portion configured to removably attach to communication devices such as mobile phones, tablet computers, media players, and the like. The retainer portion may be configured so as not to interfere with a user's view of a display panel of the communication device. In some embodiments, a plurality of lenses may be provided, and the lenses may be removably attached to the retainer portion and may be interchangeable. A structure for providing a flash may also be provided. In some embodiments, additional features may be provided, such as attachment components to facilitate attachment to stability devices, such as tripods, and to user-wearable accessories.

20 Claims, 44 Drawing Sheets

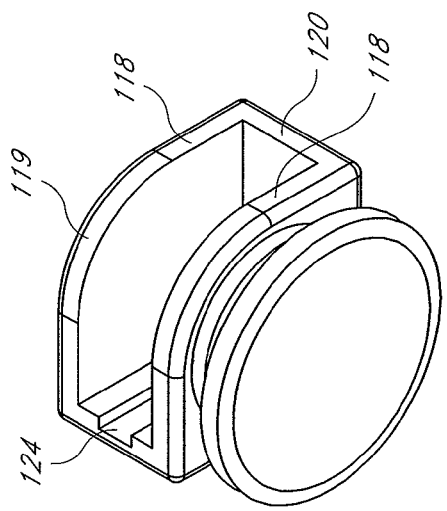
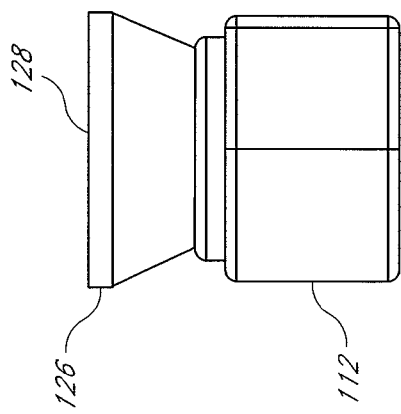
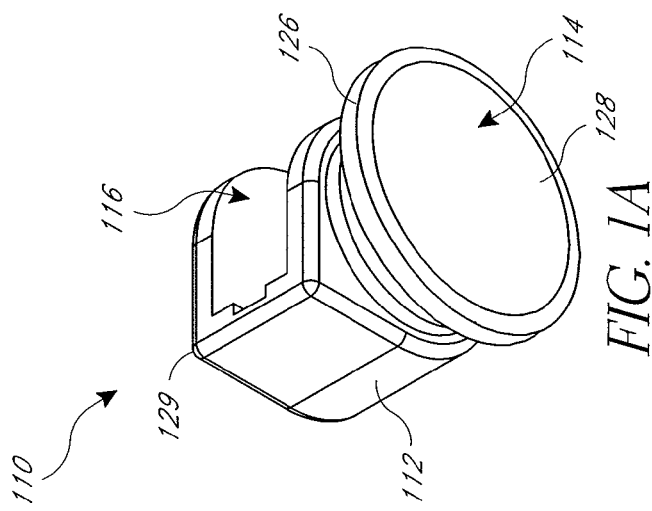

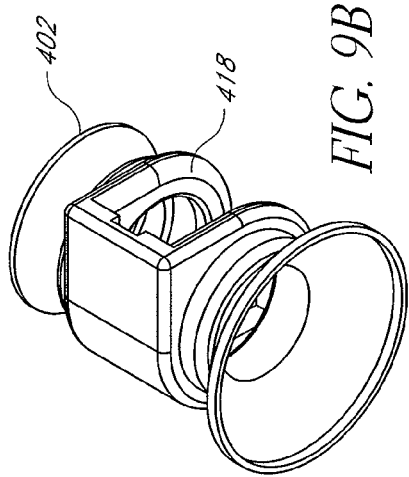
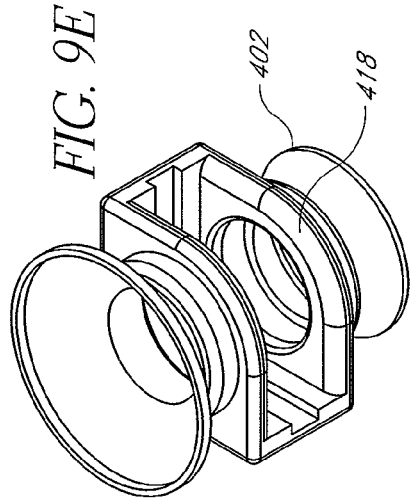
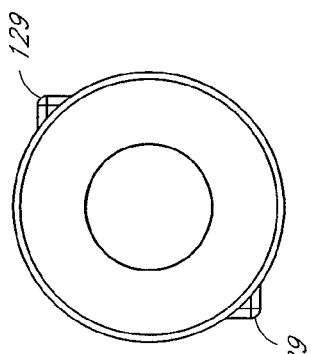
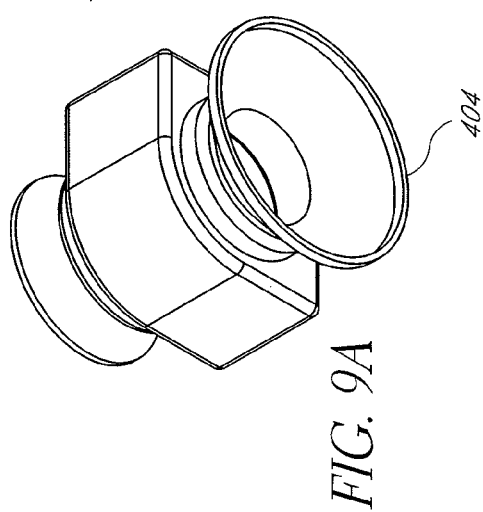
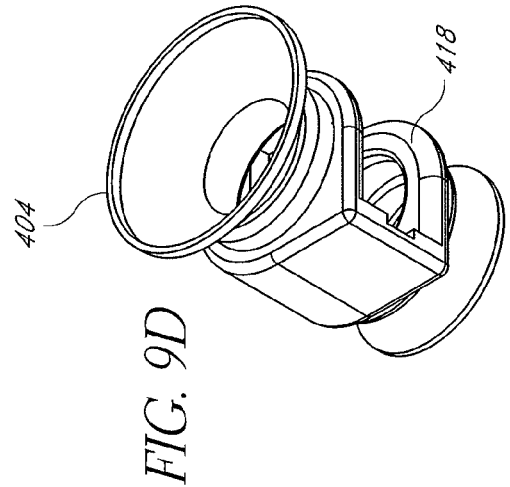

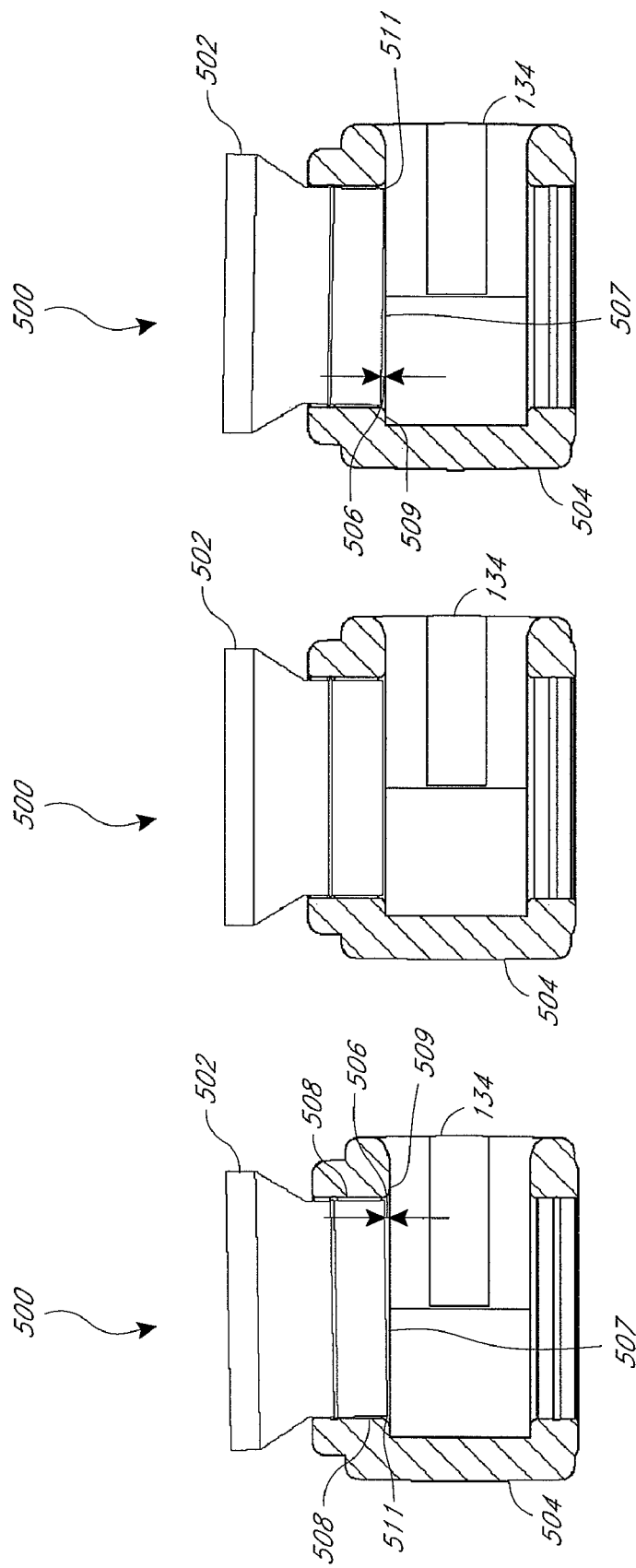

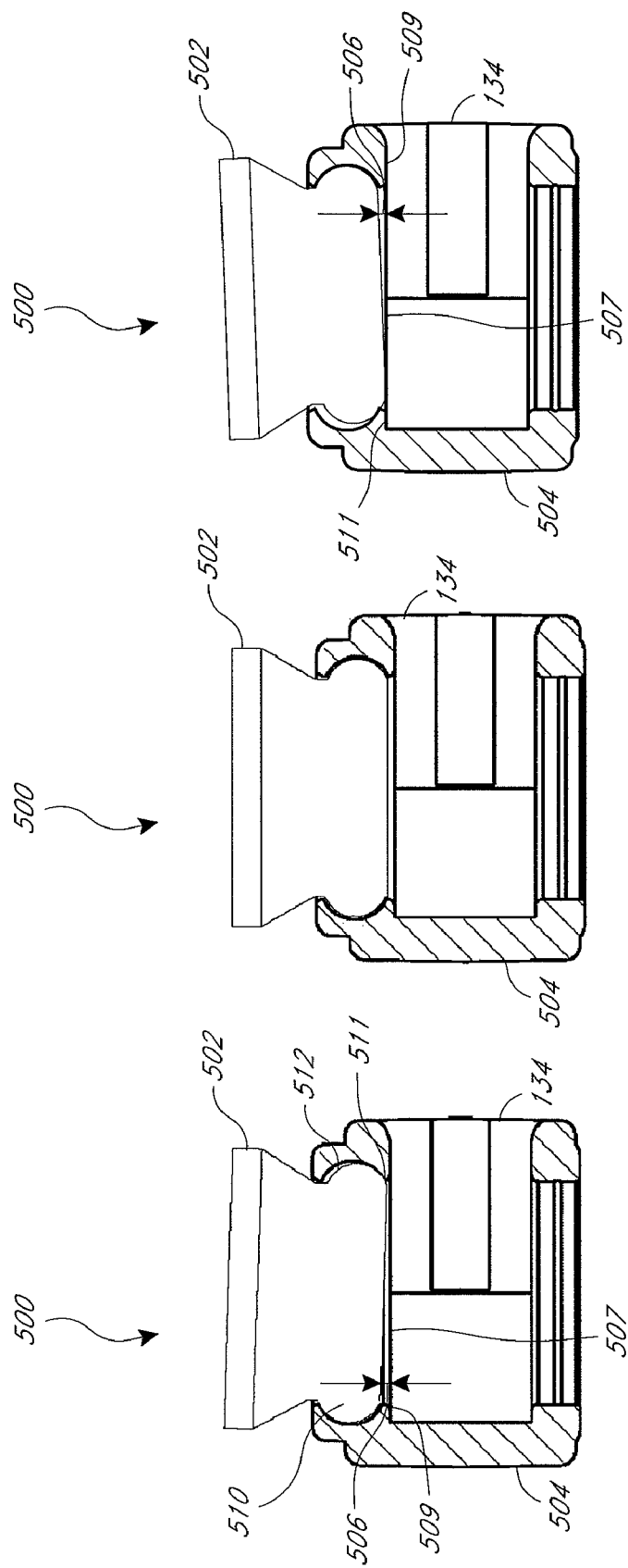

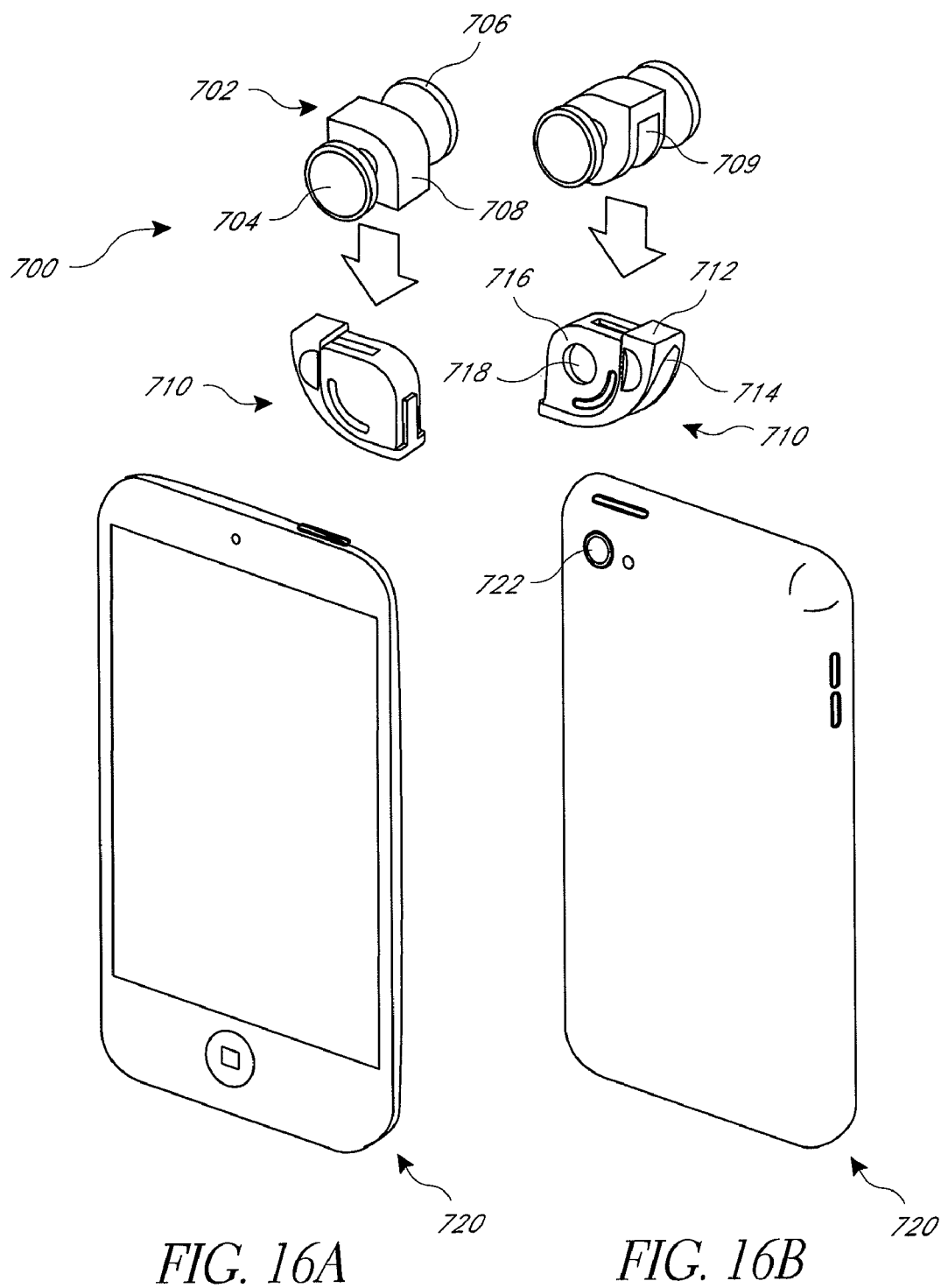
*FIG. 16A*        *FIG. 16B*

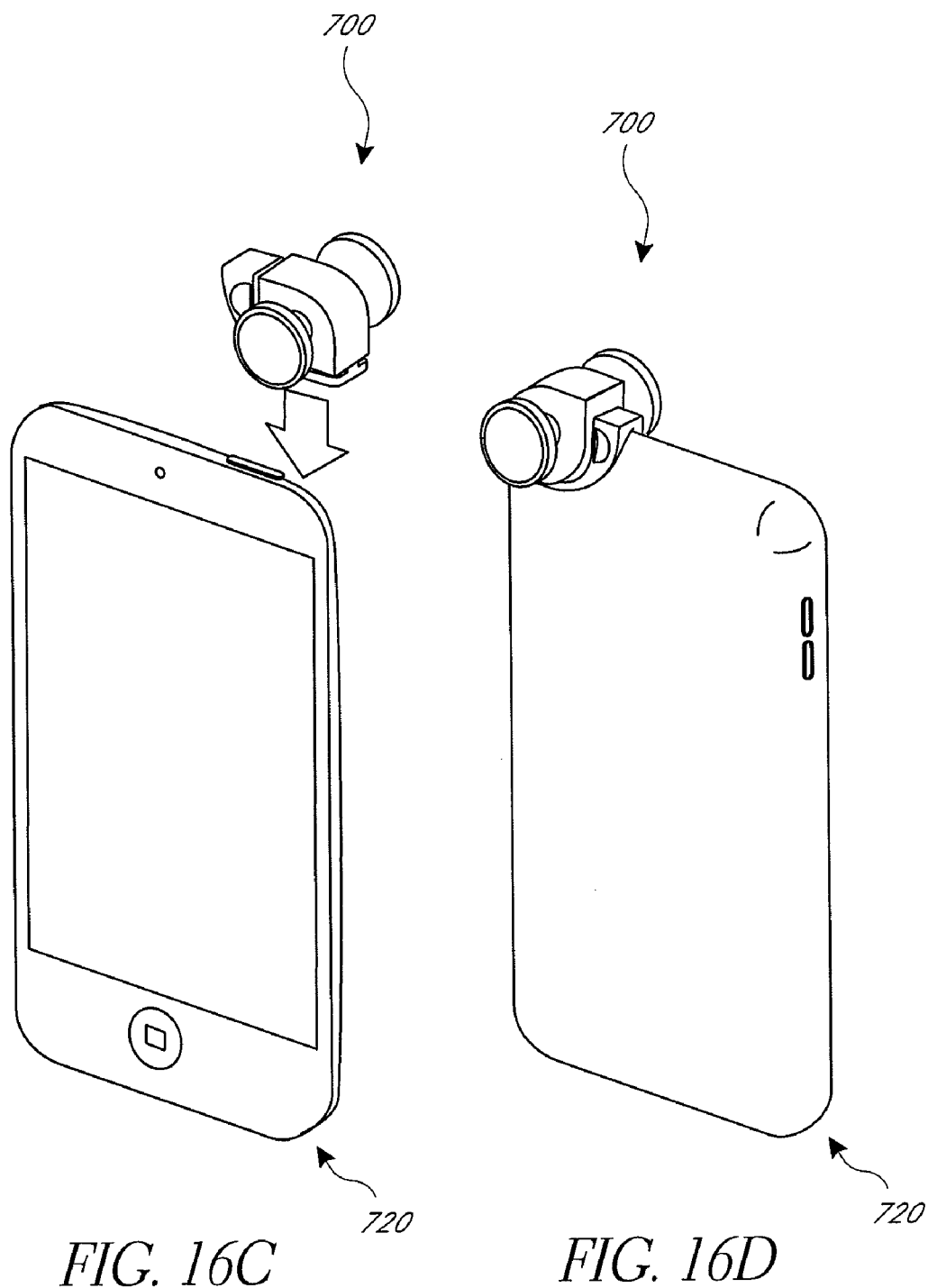
*FIG. 16C*  *FIG. 16D*

SELECTIVELY ATTACHABLE AND REMOVABLE LENSES FOR COMMUNICATION DEVICES

RELATED APPLICATIONS

This application claims the benefit, under 35 U.S.C. §119(e), of U.S. Provisional Patent Application No. 61/454,136, filed on Mar. 18, 2011 and entitled "Removable Lenses for Communication Devices," U.S. Provisional Patent Application No. 61/503,835, filed on Jul. 1, 2011 and entitled "Removable Lenses for Communication Devices," and U.S. Provisional Patent Application No. 61/585,857, filed on Jan. 12, 2012 and entitled "Selectively Attachable and Removable Lenses for Communication Devices," the entire contents of all four of which are hereby incorporated by reference herein and made part of this specification for all that they disclose.

BACKGROUND OF THE INVENTIONS

1. Field of the Inventions

This invention relates generally to accessories for communication devices (e.g., mobile telephones, mobile texting devices, electronic pad devices, laptop computers, desktop computers, gaming devices, and/or devices capable of linking electronically to another device or to a network such as the Internet, etc.), and specifically to removable functional components for communication devices.

2. Description of the Related Art

In recent years, many advances in computer networking and processing technology have made it possible for communication devices to include cameras that permit users to capture images. In many cases, these images can be stored, processed, and transmitted. However, there are many design constraints on onboard cameras in communication devices that can limit the weight, size, expense, shape, adjustability, and overall quality of the lensing systems of such cameras. Consequently, many cameras in communications devices are inadequate for a wide variety of photographic needs and may produce poor quality photographic images. These deficiencies cannot be addressed by existing modular or detachable lensing systems for use with conventional film or digital cameras due to significant differences between such lensing systems and communication devices, including incompatibilities in attachment structures, weight, optics, size, transportation, storage, ergonomics, and/or portability.

BRIEF DESCRIPTION OF THE DRAWINGS

Certain embodiments of the inventions will now be discussed in detail with reference to the following figures. These figures are provided for illustrative purposes only, and the inventions are not limited to the subject matter illustrated in the figures.

FIGS. 1A-1I illustrate nine different views of an example of a removably attachable lens system for a communication device.

FIGS. 9A-9E illustrate additional views of the lens system of FIGS. 8A-8I.

FIGS. 11A-11F illustrate examples of lens systems with lens portions that are adjustable with respect to retainer portions.

FIGS. 16A-16F illustrate an example of a lens system that includes an adaptor.

Figure 1F:
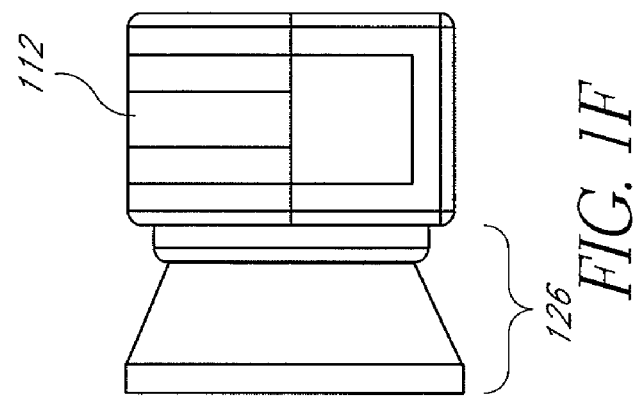
Figure 1E:
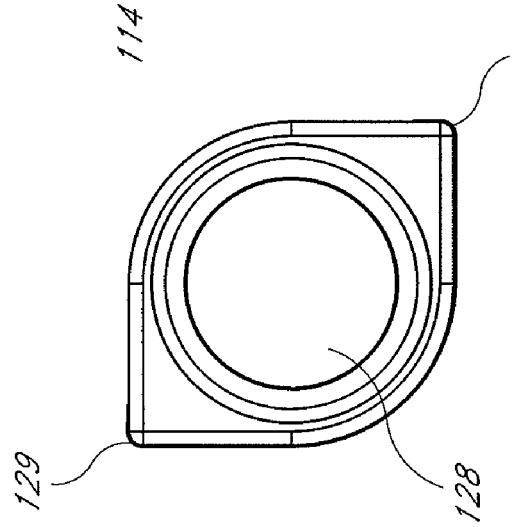
Figure 1D:
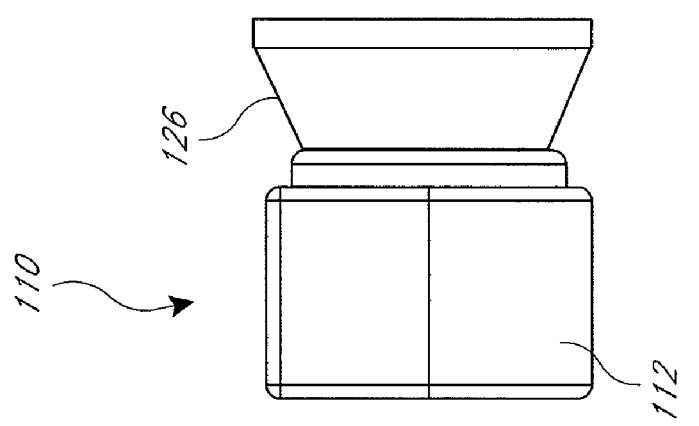
Figure 1I:
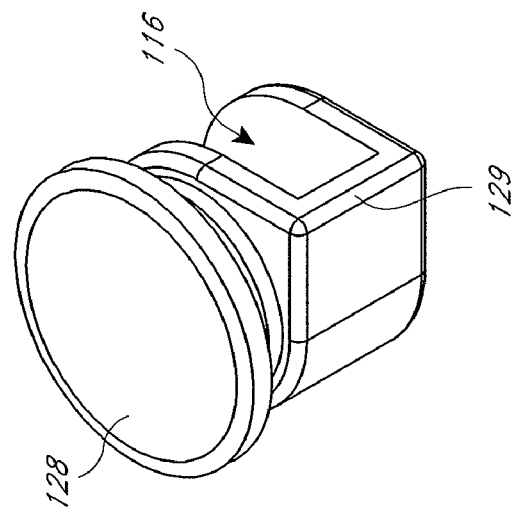
Figure 1H:
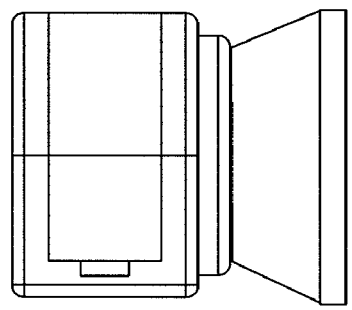
Figure 1G:
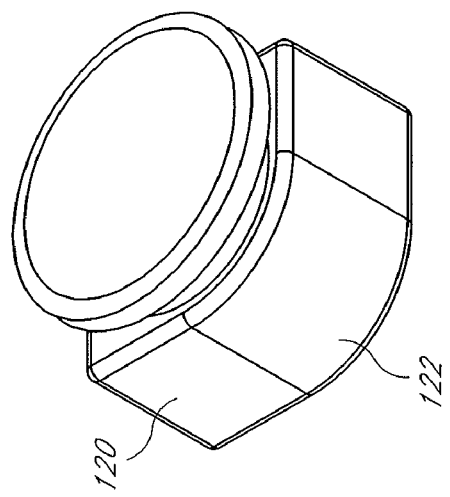

Many other types of communication devices besides those illustrated and described herein can be used.

DETAILED DESCRIPTION OF THE PREFERRED EMBODIMENT

The following detailed description is now directed to certain specific examples of embodiments of the disclosure. In this description, reference is made to the drawings wherein like parts are designated with like numerals throughout the description and the drawings. The inventions are not limited to the examples expressly illustrated or described in this specification.

Referring to FIGS. 1A-1I, an example of a removably attachable lens component 110 is illustrated in many different views. In some embodiments, as illustrated, the lens component 110 can generally comprise a retainer portion 112 and a lens portion 114. The retainer portion 112 is generally configured to be removably attachable to a communication device such that the lens portion 114 can be positioned in a region generally covering or near an onboard camera lens in the communication device to enable the lens portion 114 to cooperate optically with the onboard camera, to provide optical enhancements, improvements, modifications, and/or alternatives. In some embodiments, as illustrated, the retainer portion 112 is shaped so as to attach to the communication device in a region and in a manner that permits a user to see all or virtually all of a viewing portion 131 of the communication device without obstruction or without appreciable obstruction.

For example, the retainer portion 112 can comprise a channel 116 with a plurality of sidewalls 118. The width of the channel 116, e.g., the distance between the respective sidewalls 118, can be configured to be generally complimentary to the thickness of a portion of the communication device(s) on which the retainer portion 112 is configured to attach. In some embodiments, the natural width of the channel 116 is approximately the same size or slightly smaller than the thickness of a corner, such as an upper corner, of the outside housing of a communication device near the light aperture of the onboard camera of the communication device.

Figure 2A:
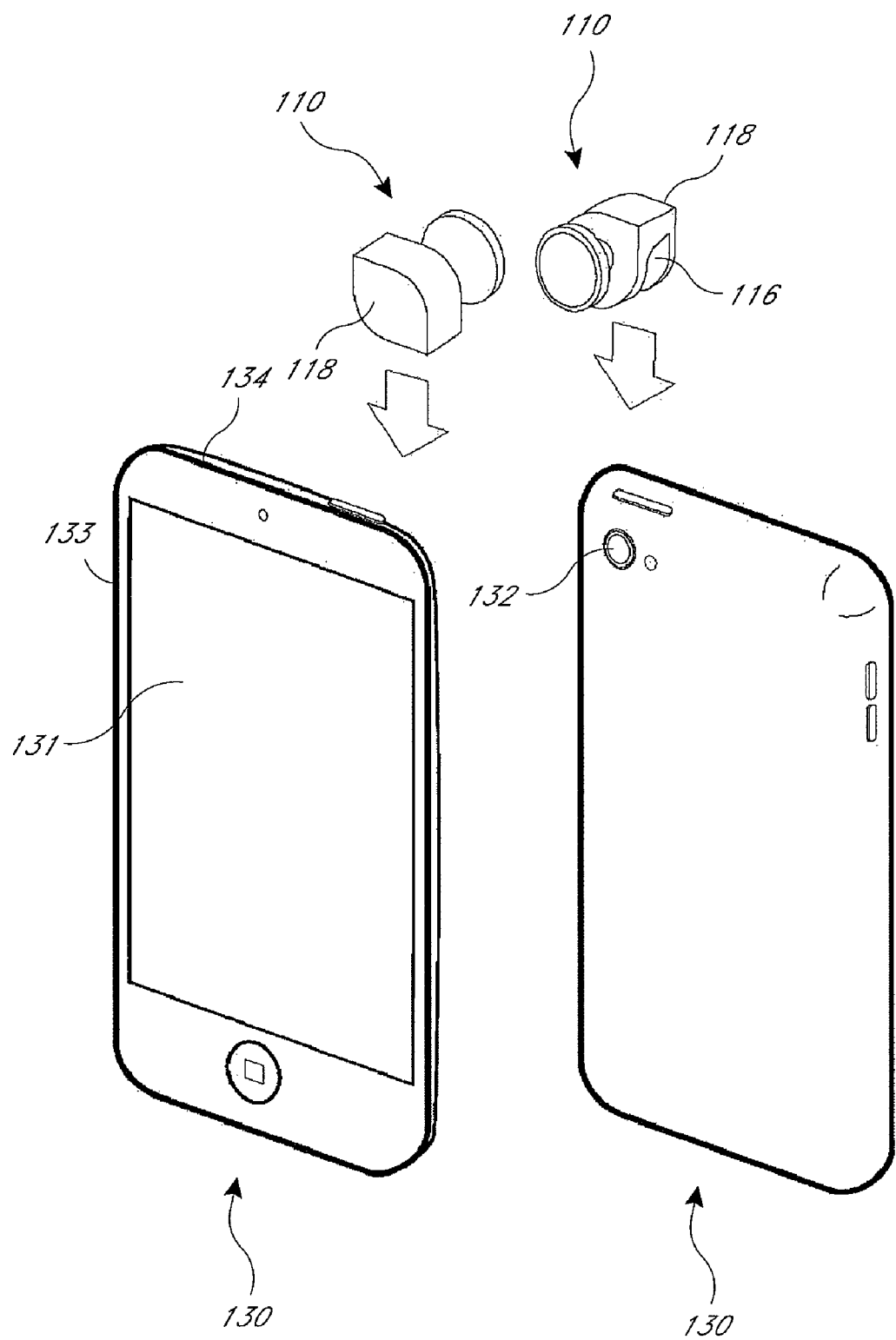
FIGS. 2A-2B illustrate the lens system of FIGS. 1A-1I being attached to examples of communication devices.
Figure 2B:
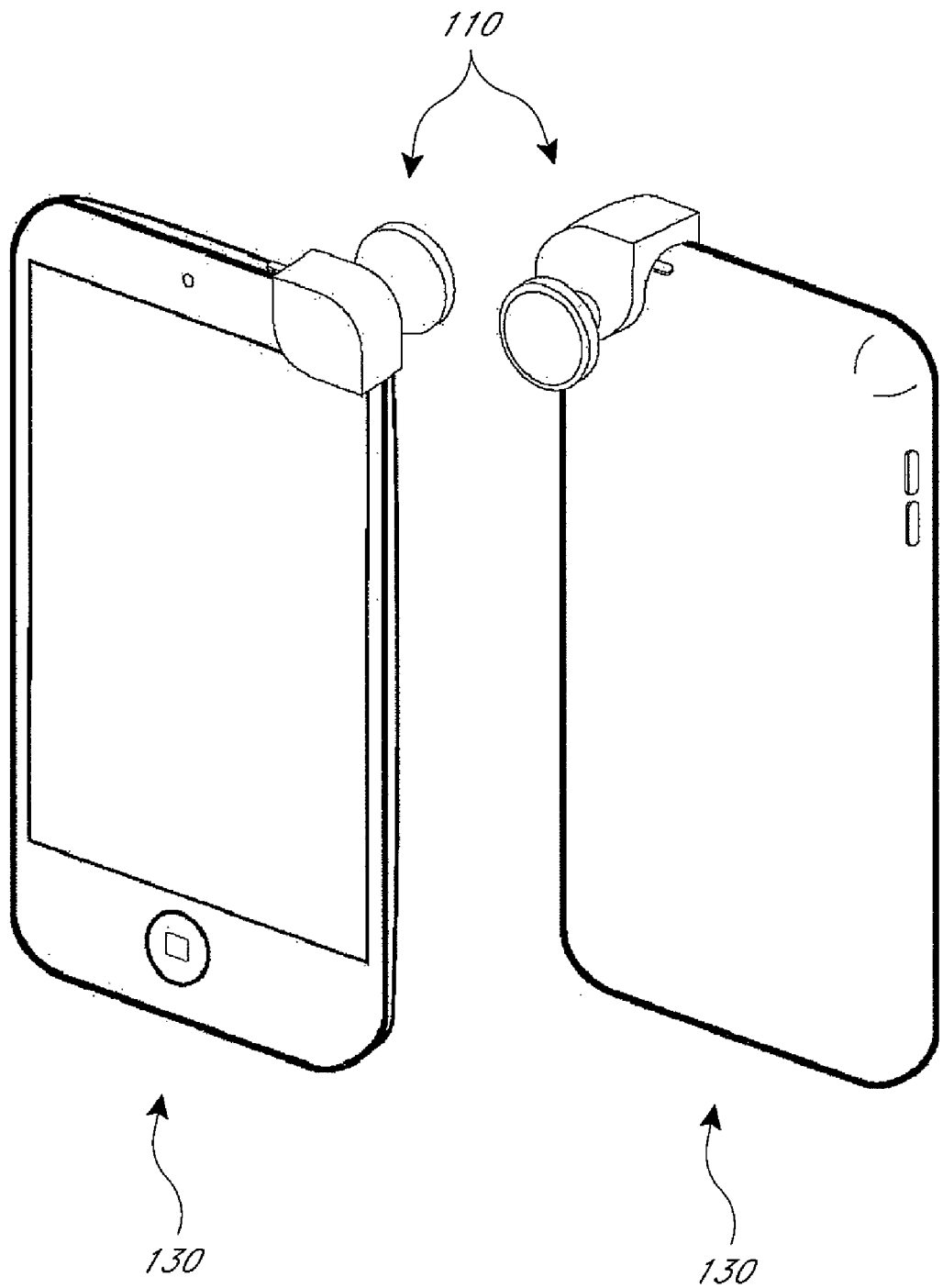
Figure 3A:
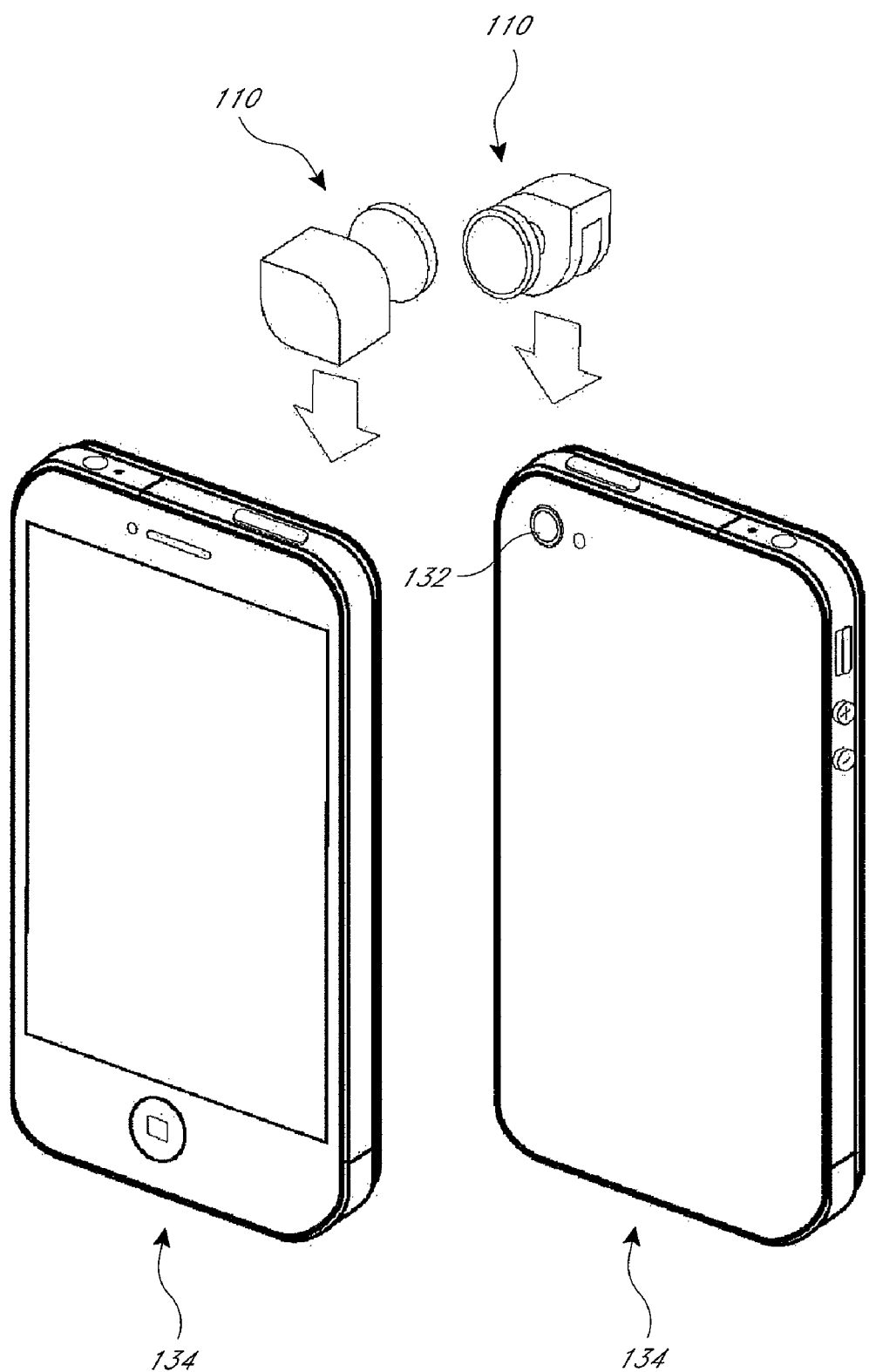
FIGS. 3A, 3B, 4A, 4B, 5A, 5B, 6A, and 6B illustrate other examples of lens systems being attached to other examples of communication devices.
Figure 3B:
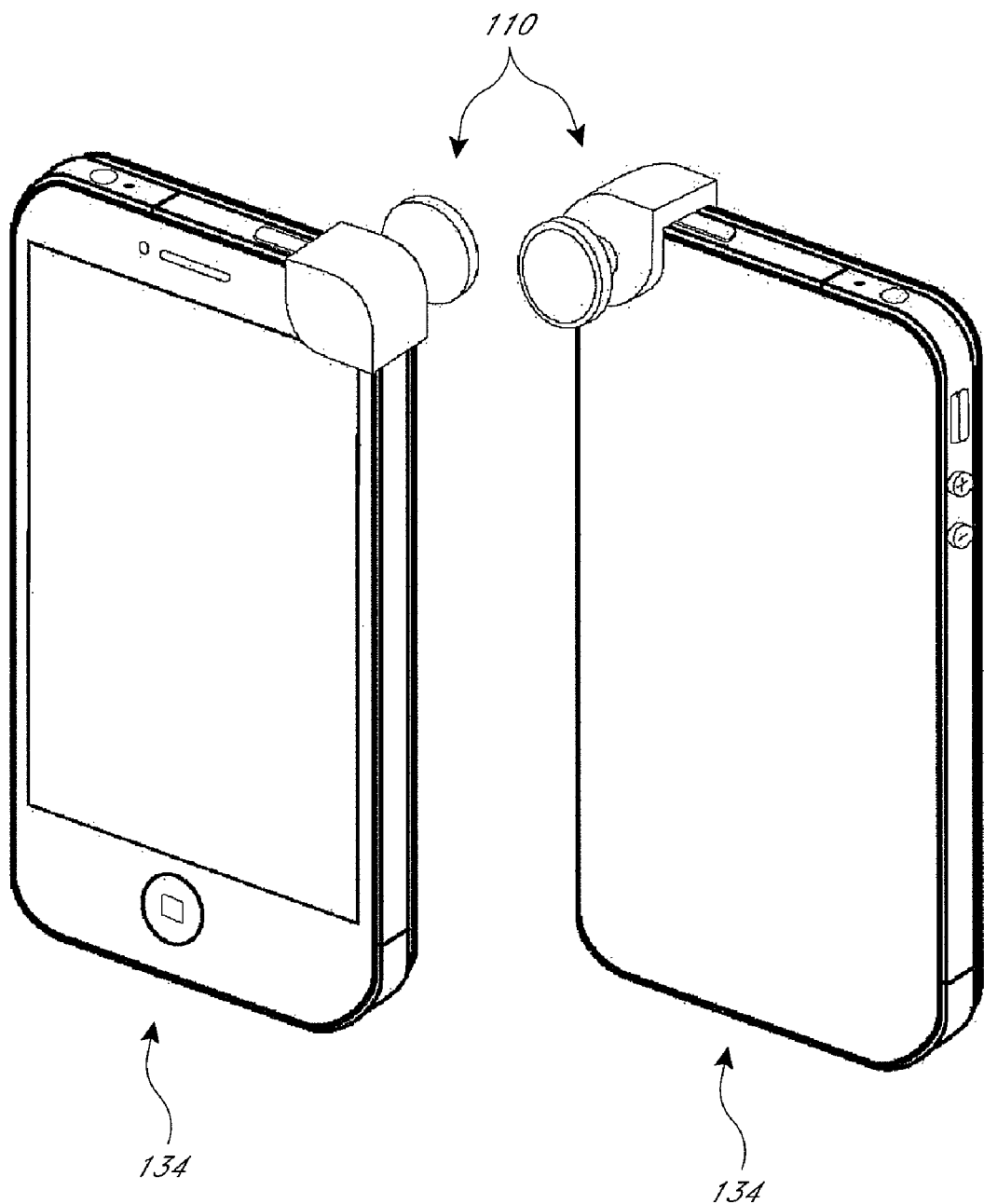
Figure 4A:
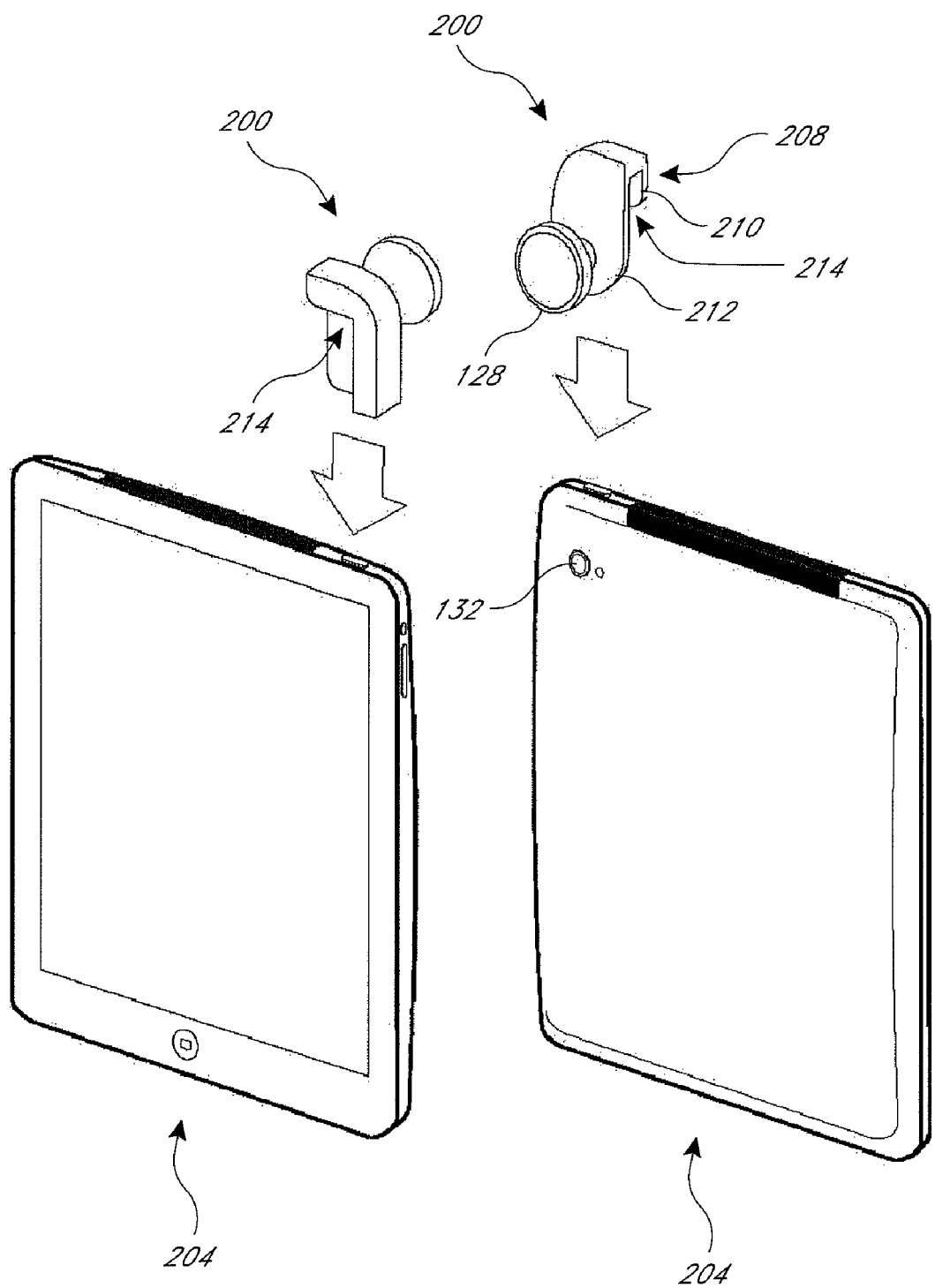
Figure 4B:
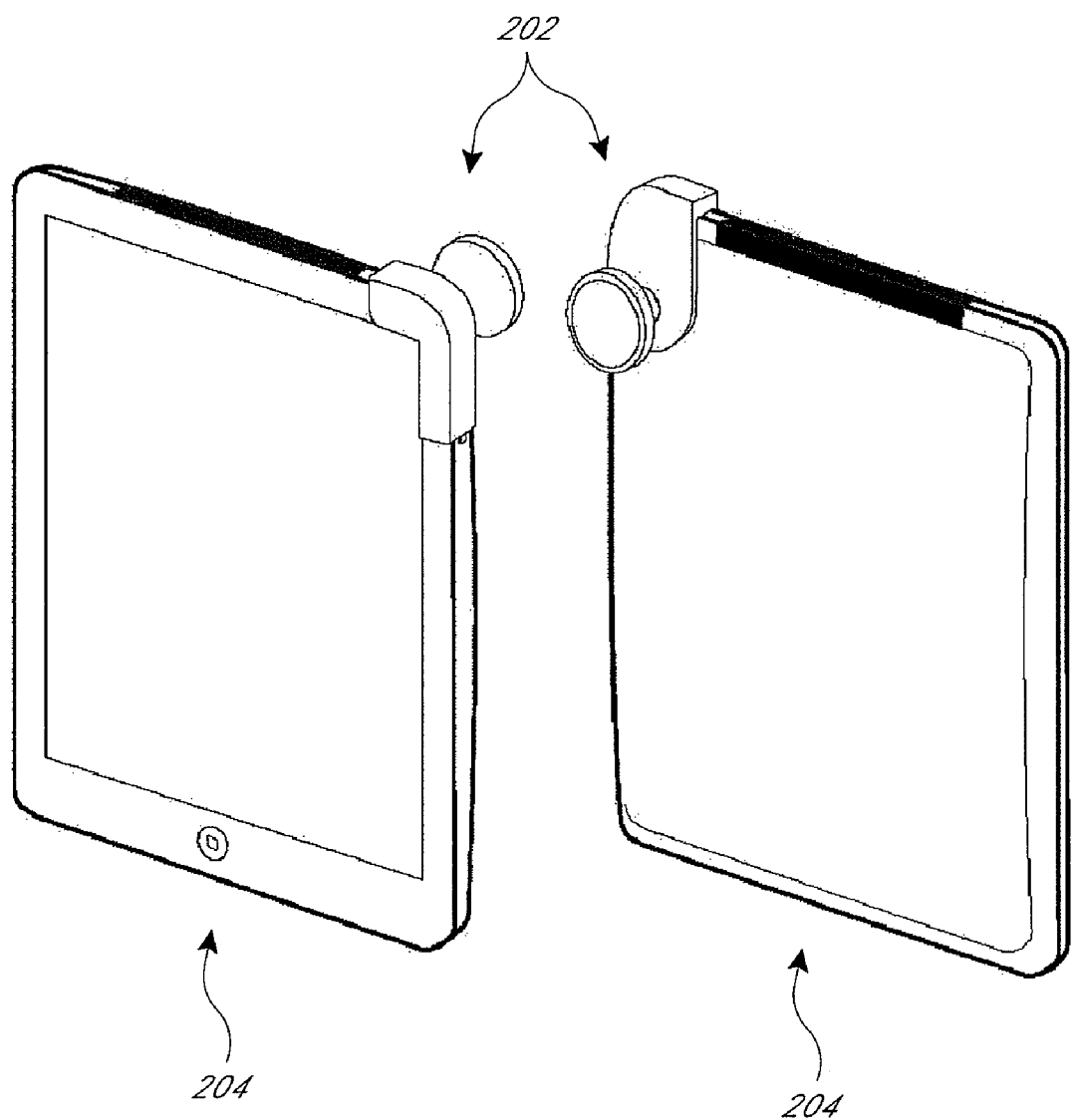
Figure 5A:
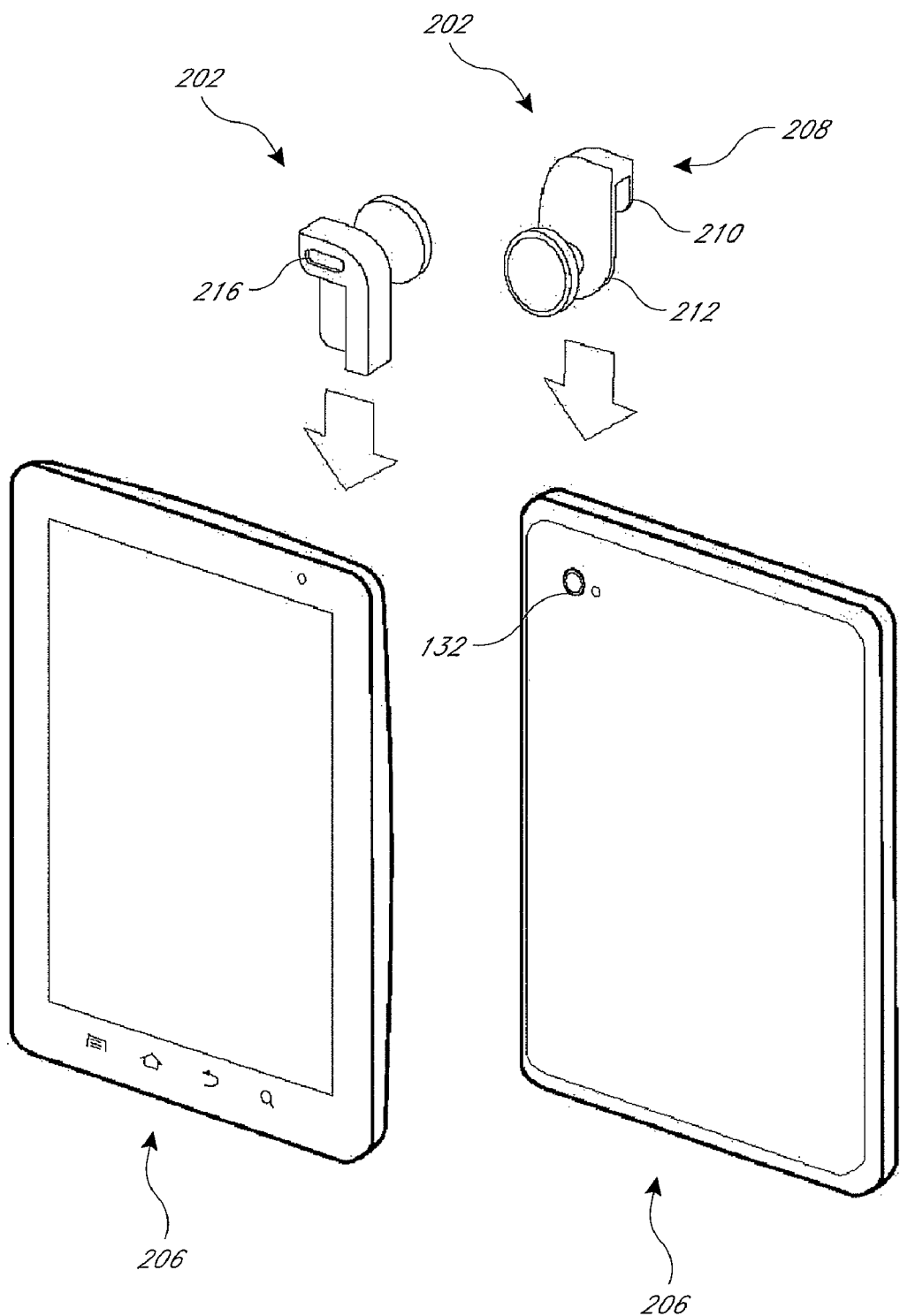
Figure 5B:
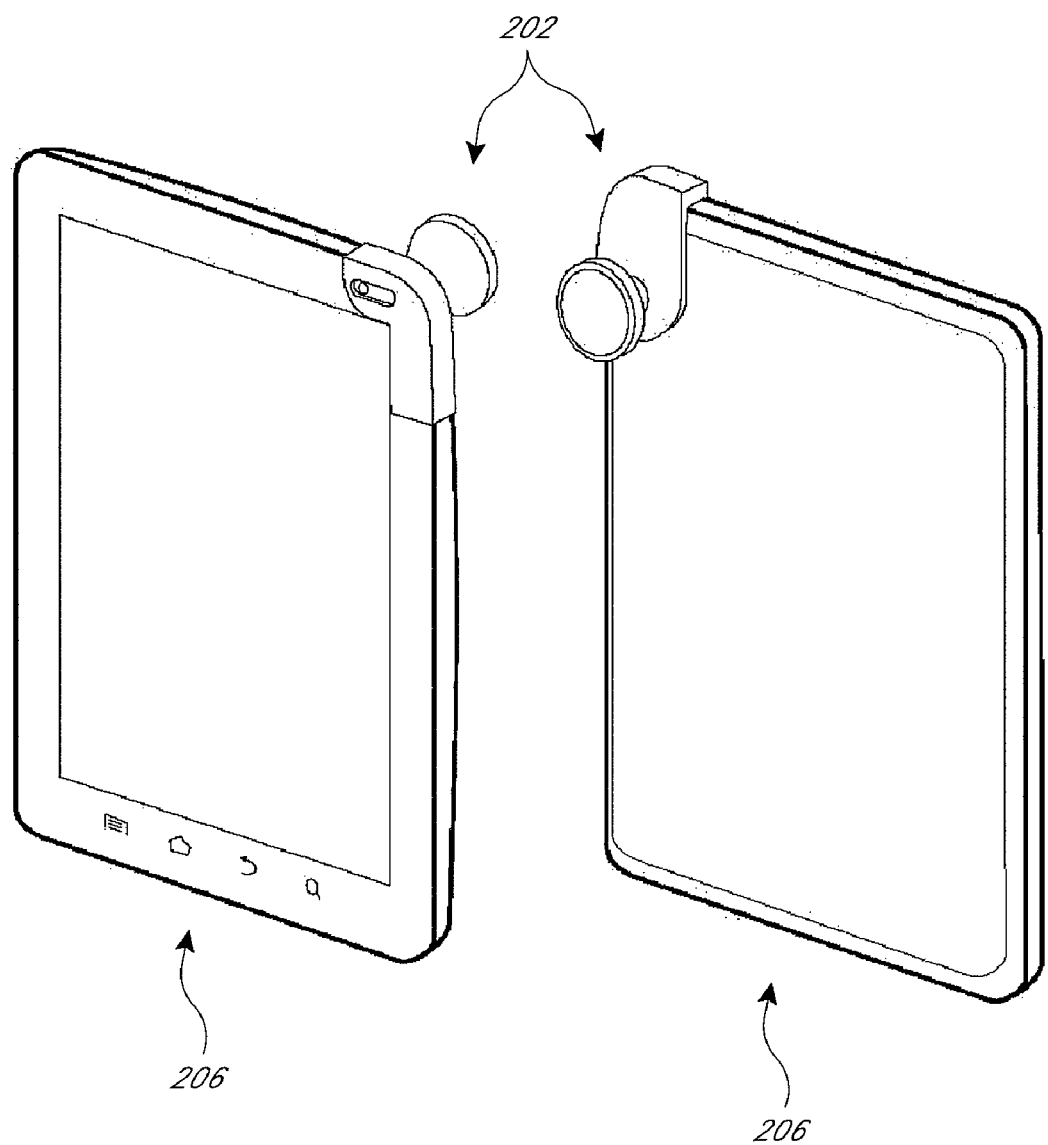

In some embodiments, as illustrated, one or more of the plurality of walls 118 can have a curvilinear shape 119 along one or more edges to permit the retainer portion 112 to provide increased distance of contact along the edge of the communication device while diminishing the area across a transverse surface of the device that is obstructed by the retainer portion 112. For example, in some embodiments, as illustrated, the curvilinear shape along one or more edges of the walls 118 permits the retainer portion 112 to extend along and attach to at least a portion of two generally converging or generally perpendicular outer edges or sides of a communication device that is approximately as wide as the lens portion 114, while diminishing the amount of space on the front of the device that is blocked. In the example shown in FIGS. 1A-1I, the curvilinear shape of the edge of the walls 118 can avoid or omit a lower pointed or sharp corner that may otherwise extend into and obstruct the viewing portion of the communication device. In some embodiments, the retainer does not appreciably block or obstruct the viewing surface, as shown in FIG. 2B.

All or part of the retainer portion 112, such as one or more of the plurality of walls 118, can be made of a material (e.g., a polymer or a silicone) that is sufficiently flexible to permit deformation (e.g., compression, bending, or stretching) of one or more walls 118, so that the channel 116 can be temporarily widened while sliding the lens component 110 onto a communication device, but at least a portion of one or more of the walls 118 can be sufficiently stiff, rigid, or resilient to urge one or more of the plurality of walls 118 to return to its original position and thereby exert a gripping force against a portion of the communication device. The material of the retainer portion 112, especially the region on the inner side of the walls 118 within the channel 116, can also be tacky or somewhat slide resistant to enhance the gripping of the retainer portion 112 to the communication device. In some embodiments, the gripping force and/or slide resistance can reduce or eliminate the need to attach a permanent or temporary mounting component to the communication device. For example, the lens component 110 can be repeatedly attached to and removed from a communication device without requiring (though not prohibiting) installation on the communication device of a separate permanently or semi-permanently attached mounting component such as a bracket, magnet, adhesive, or other fastening component, thereby providing ease of installation while preserving the original overall shape, appearance, functionality, compatibility (e.g., with other communication devices or cases), and/or feel of the communication device when the lens component is removed.

The retainer portion 112 can also comprise an upper wall 120 that can be shaped in some embodiments to generally correspond to the shape of one or more edges of a communication device. As illustrated, the upper wall 120 has a generally curvilinear shape with a rounded corner 122. The retainer portion 114 can also include one or more internal surface contours 124 configured to generally avoid interference with one or more external features on a communication device. For example, as illustrated, the channel 116 can include a surface contour 124 in the form of a groove to avoid interference or inadvertent contact with a button or other feature on a communication device when the lens component 110 is attached to the communication device. As illustrated, the sidewalls 118 of the retainer 112 can comprise one or more generally pointed or angular regions 129.

In some embodiments, as illustrated, the retainer portion 112 can be configured to grip two nonparallel sides of a communication device. For example, the retainer portion 112 can contact at least a first generally vertical side or edge surface 133 of a communication device and at least a second generally horizontal and generally orthogonal side or edge surface 134 of a communication device (e.g., the lateral side and the top side of the communication device) at the same time during use. In some embodiments, this contact by multiple generally perpendicular edges or surfaces permits repeatable adequately precise placement of the retainer portion 112 in a single attachment motion without requiring user adjustment of the location or structure of the retainer portion 112 during attachment. In some embodiments, two or more contacting surfaces in the retainer portion 112 can converge at an upper corner having a rounded external surface. In some embodiments, as illustrated, the retainer portion 112 is substantially smaller than the communication device to which it is configured to attach, or even substantially smaller than the viewing portion of the communication device to which it is configured to attach. In some embodiments, a retainer can be configured to contact only one side or edge (e.g., the generally vertical or the generally horizontal side or edge), such as by contacting both the front and rear surface of such side of edge but without also requiring contact with another side or edge. An example of such an embodiment can generally be formed from a retainer portion with a general U-shape comprising an upper wall, two side walls, and an opening on each side of the side walls.

In some embodiments, the retainer portion 112 can permit the lens component 110 to be attached to a communication device without requiring non-stock mounts on the communication device and without requiring dynamic mounts on the retainer portion 112 itself (e.g. fasteners, screws, adjustable clamps, etc.). Thus, a user can attach the lens component 110 to a corner of a communication device by simply sliding it, for example, onto the corner of the communication device, and can remove it by simply pulling it off, without requiring user adjustment during attachment. In some embodiments, as illustrated, the lens component 110 can remain on the communication device by way of a friction fit. The attachment to the communication device can avoid a residue deposit from adhesive, scratches to the exterior surface, or other damage or alteration of the communication device. In some embodiments, the retainer portion can be sufficiently wide and/or long so that it is adapted to receive an end and/or side region (e.g., two or more corners) of a communication device rather than merely one corner, and the other aspects of other embodiments disclosed herein can apply to such embodiments, including but not limited to the shape and materials of construction and the accomplishment of a friction fit between the retainer portion and the end and/or side region of a communication device.

The lens portion 114 generally comprises a transparent lens 128, which is typically made of a glass or a polymer, and a securing structure 126. The securing structure 126 can be made of many different types of materials or combinations of materials, such as metals (e.g., aluminum or steel) or plastics. The securing structure 126 can include a generally wide-area opening for receiving the lens 128 and a generally narrow-area region for attachment to the retainer portion 112. In some embodiments, the securing structure 126 and the retainer portion 112 can be configured to slide or otherwise move with respect to each other in a limited manner to allow for adjustment of the position of the lens 128 with respect to the onboard camera lens of a communication device (e.g., for the purpose of addressing manufacturing tolerances in the location of the onboard camera lenses in some communication devices). As illustrated, the mechanism or structure for attachment or securement of the lens portion 114 to the retainer portion 112 can be separate from and/or can operate independently of the mechanism or structure for attachment or securement of the retainer portion 112 to the communication device. In some embodiments, as illustrated, the outside surface of the securing structure 126 can taper inwardly from the lens-receiving region to the retainer-attaching region to diminish the amount of material used in manufacturing and to diminish the size and weight of the retainer lens portion 114. In some embodiments, the lens component can be very small, such as less than or equal to about 2½ inches or less than or equal to about 1½ inches across.

The lens 128 can include multiple lenses or lens components. In some embodiments (not shown), the lens component 110 can comprise more complex lensing systems, such as lensing systems in which the focal length of the lensing system can be manually or electronically adjusted, such as with a lever or rolling dial or with electronic or motor control, which may be positioned between the lens 128 and the retainer portion 112. An electronic or motor control can be attached and adjusted using software in the communication device, either by a wired or wireless connection to the mobile communication device. Other specialized lenses in the lensing system can include a telephoto lens systems configured to enlarge images, wide-angle lenses, fish-eye lenses, macroscopic lenses, and microscopic lenses.

The lens 128 can also comprise coatings or other features to increase scratch resistance, diminish glare or reflection, or decrease or filter light transmitted through the lens 128. The lens component 110 can also include a cover configured to be fitted over the lens 128 during storage and transportation. The lens component 110 can comprise other storage and transportation features, such as a quick-release or other attachment structure to enable the lens component 110 to be conveniently carried by a user on a standard accessory carried by a person, such as a key ring, belt loop, bracelet, necklace, or other easily accessible location when not attached to a communication device. A collection or kit of different lens components 110 with various lenses having different lens features, including those described herein, can be provided within a storage case to address various photographic needs.

As illustrated in FIGS. 2A-2B and 3A-3B, the lens component 110 can be moved into proximity with a communication device 130, 134 that includes an onboard camera 132. In some embodiments, a lens component 110 can be sold or provided together as a system with the communication device 130, 134. The communication devices 130, 134 shown in FIGS. 2A-2B and 3A-3B are versions of the iPhone mobile phone sold by Apple, Inc. The lens component 110 can be oriented so that the channel 116 is directed downwardly in general alignment with an edge or corner of the communication device 130 on which the lens component 110 will be mounted and rotated so that the lens 128 will be generally aligned with the onboard camera 132. As the channel 116 contacts the edge or corner of the communication device 130, the channel 116 may expand slightly as the walls 118 flex or bend outwardly. A restoring force produced by the retainer portion 112 can urge the walls 118 back toward their original position, which can help to retain the lens component 110 on the communication device 130 during use. The lens 128 can then temporarily provide an enlarged, better focused, clearer, or otherwise enhanced, altered, manipulable, or improved image for the onboard camera 132.

FIGS. 4A-4B and 5A-5B illustrate examples of lens components 200, 202 configured to be used on tablet-type communication devices 204, 206. In the illustrated examples, the communication device 204 is an iPad communication device sold by Apple, Inc., and the communication device 206 is a Galaxy tablet sold by Samsung. The lens components 200, 202 can include various features and structures of the lens component 110 illustrated and described in connection with FIGS. 1A-H. In some embodiments, as illustrated in FIGS. 4A-B and 5A-5B, the lens components 204, 206 can include a retainer portion 208 with walls 210, 212 of different sizes and lengths. A longer or wider-area wall 212 can be provided on a side of the retainer portion 208 that is configured to suspend the lens 128 in front of the camera 132, while a shorter or smaller-area wall 210 can be provided on a side of the retainer portion 208 that is configured to extend over a portion of the surface on which the viewing portion of the communication device 204, 206 is located. The retainer portion 208 can be configured to securely attach the lens components 200, 202 while diminishing or eliminating obstruction of the viewing portion. An aperture or other functional access region 216 can be provided in the retainer portion 208 to permit access to controls or other interaction structures on the communication devices 204, 206 when the lens components 200, 202 are attached.

Figure 6A:
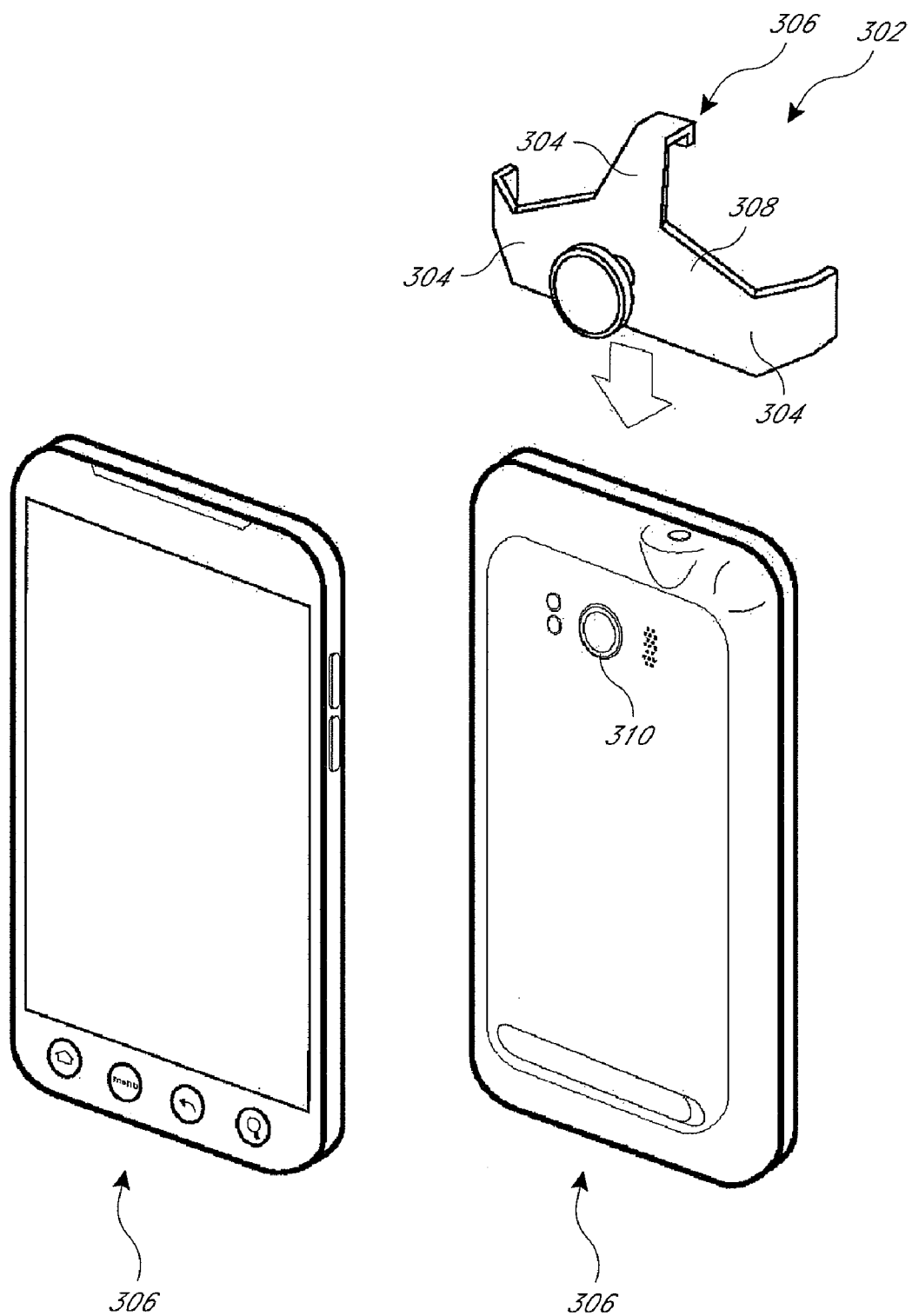
Figure 6B:
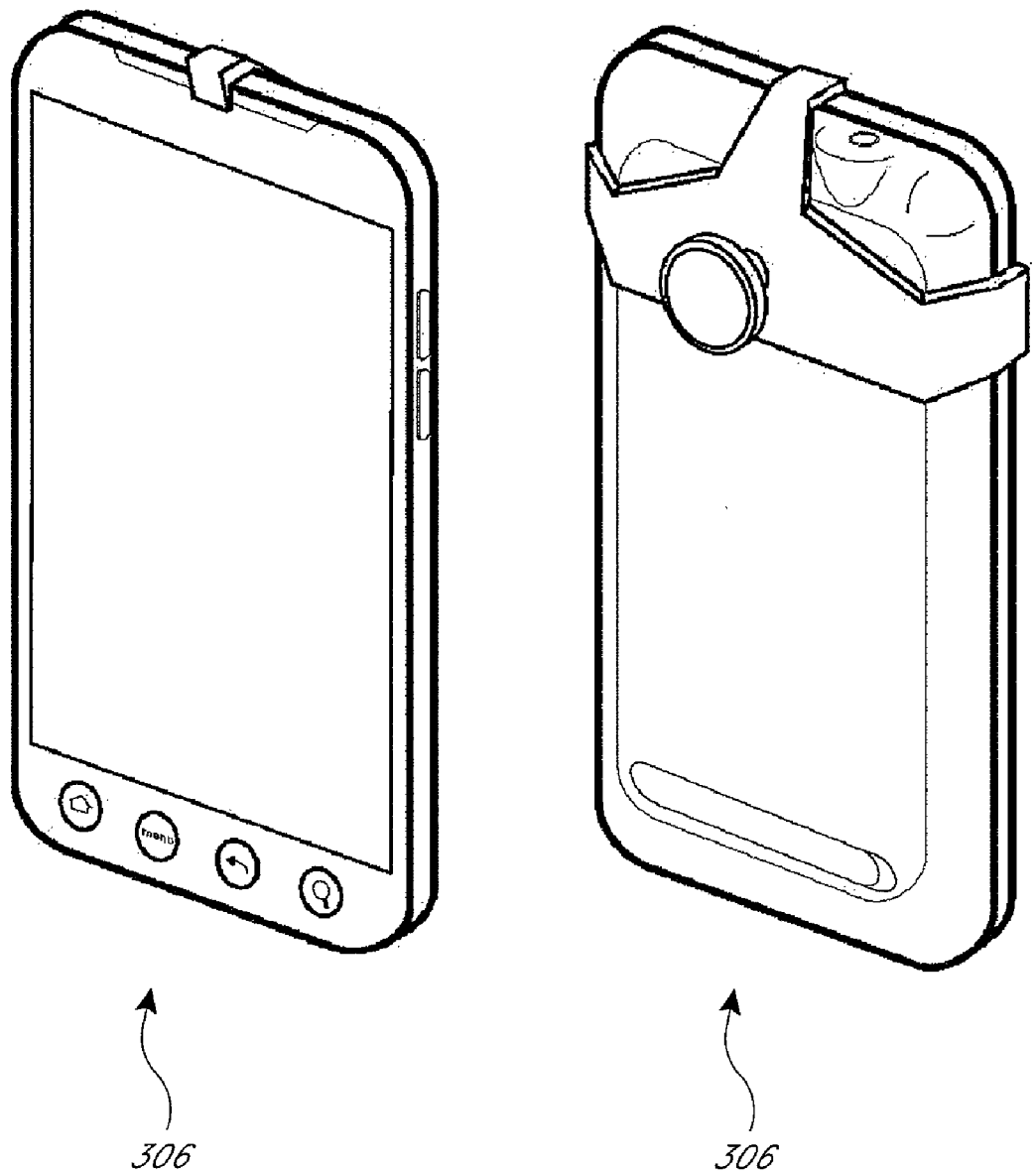
Figure 7C:
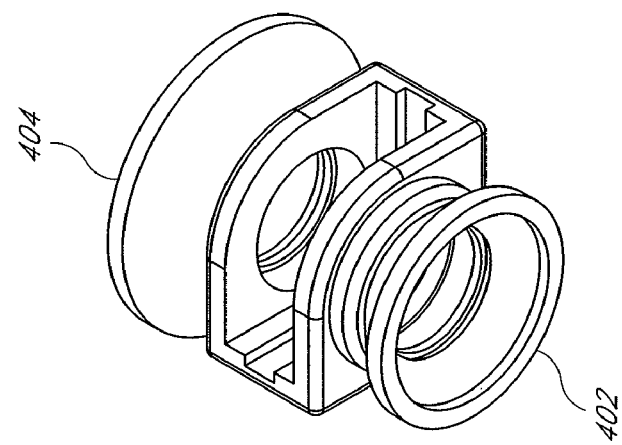
FIGS. 7A-7I illustrate an example of a multiple lens system with a plurality of lenses used for different purposes.
Figure 7B:
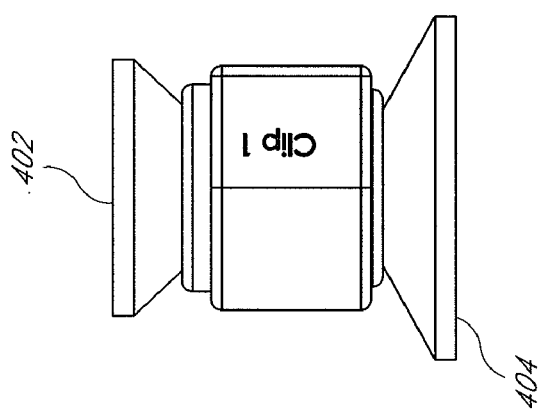
Figure 7A:
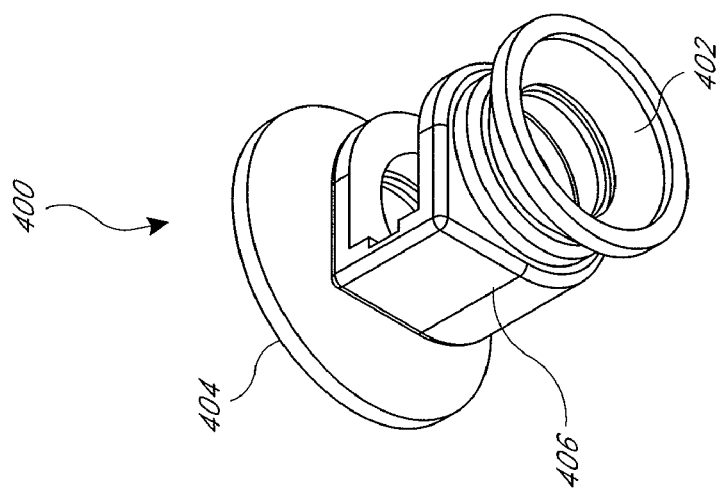
Figure 7F:
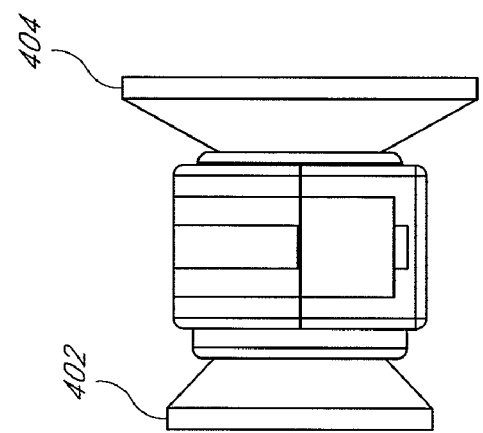
Figure 7E:
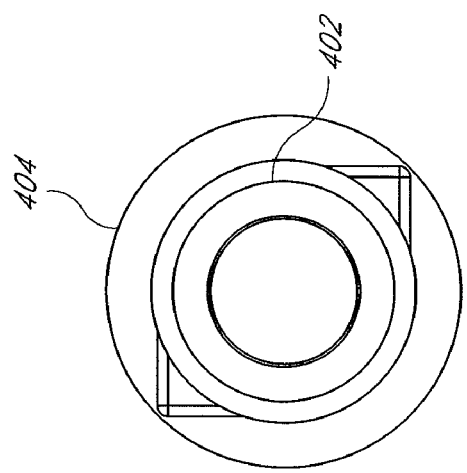
Figure 7D:
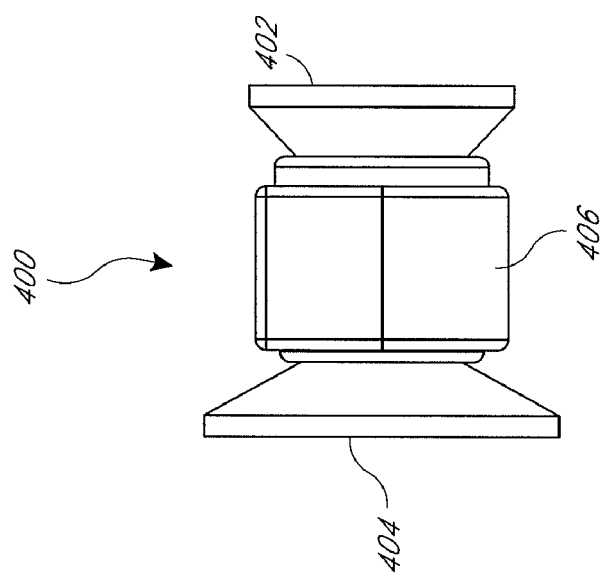
Figure 7I:
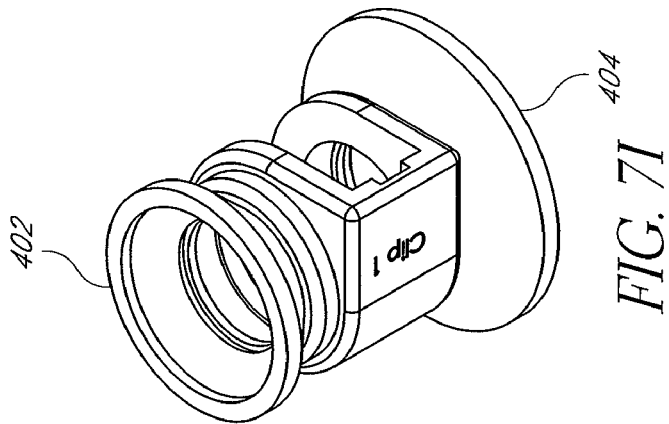
Figure 7H:
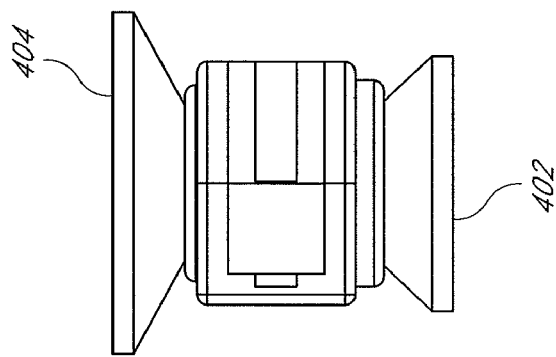
Figure 7G:
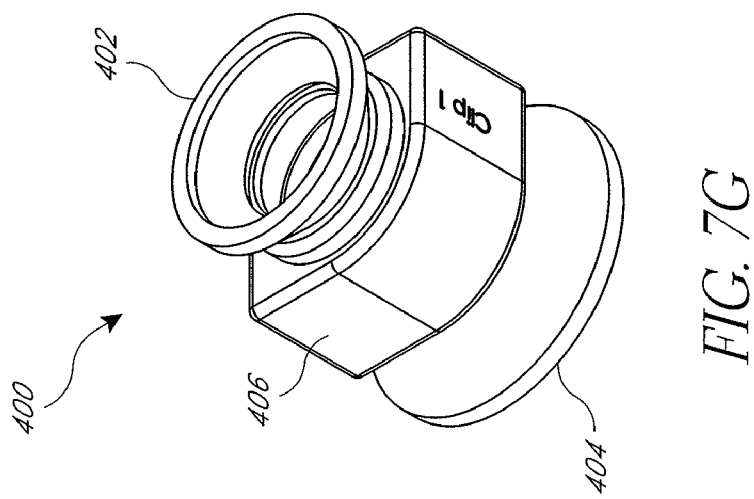
Figure 8C:
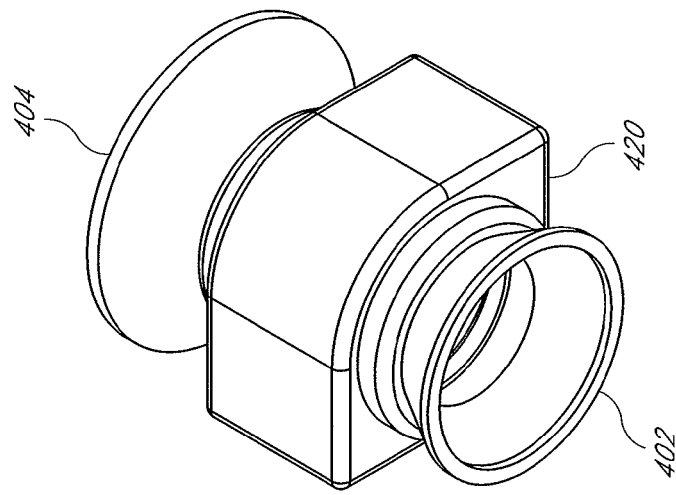
FIGS. 8A-8I illustrate an example of a lens system with additional structures to facilitate attachment to a communication device.
Figure 8B:
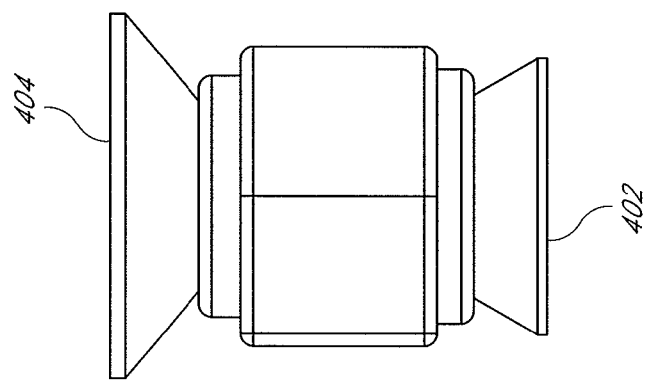
Figure 8A:
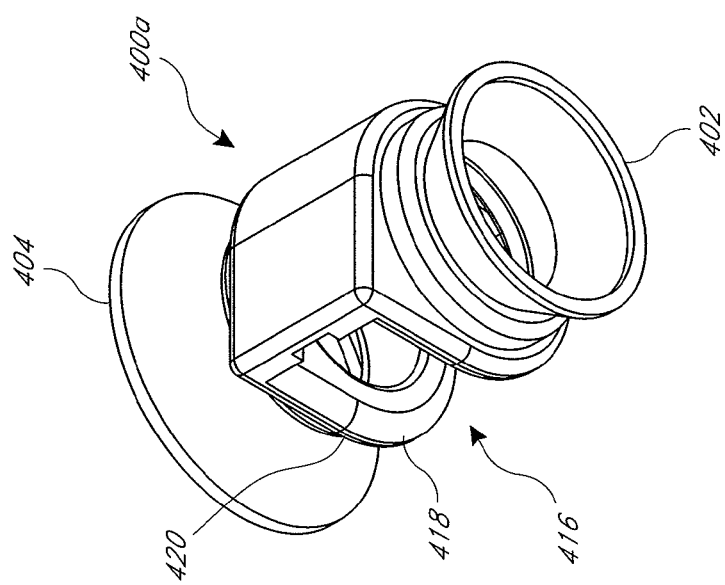
Figure 8F:
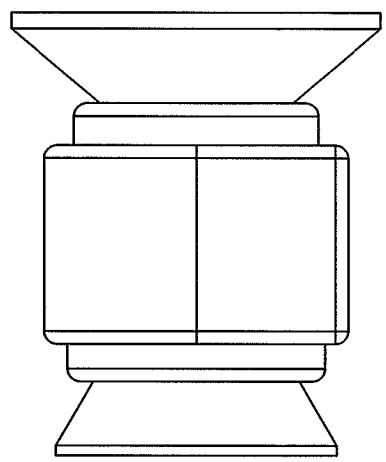
Figure 8E:
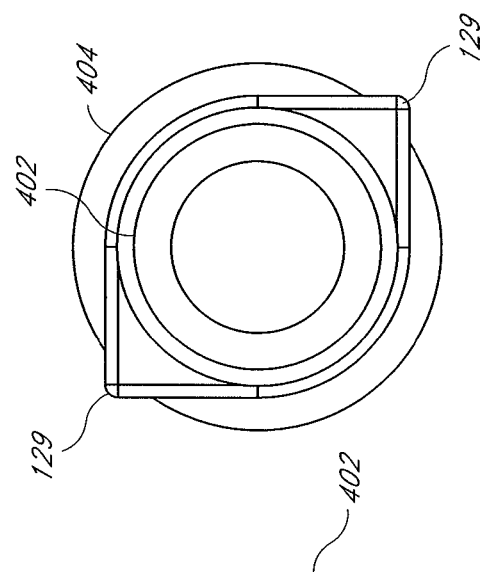
Figure 8D:
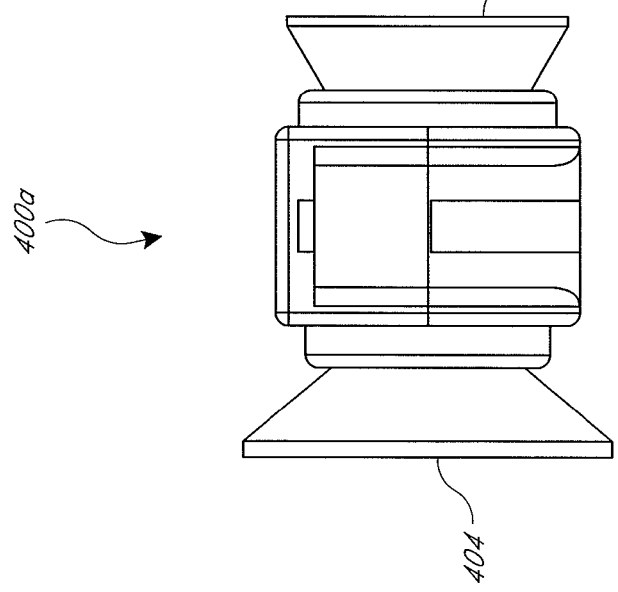
Figure 8I:
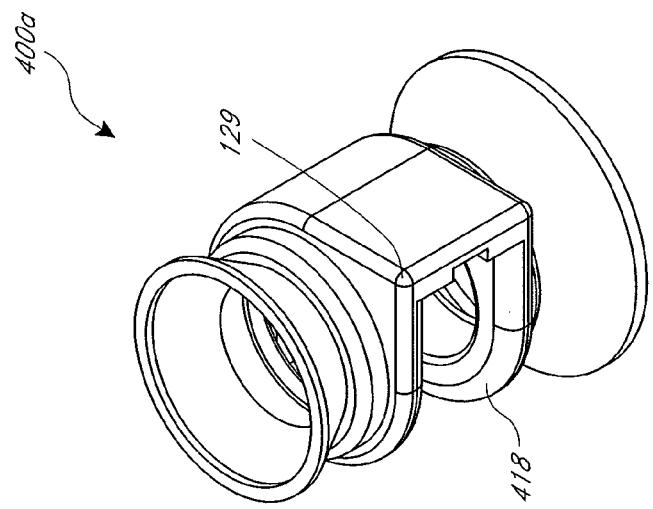
Figure 8H:
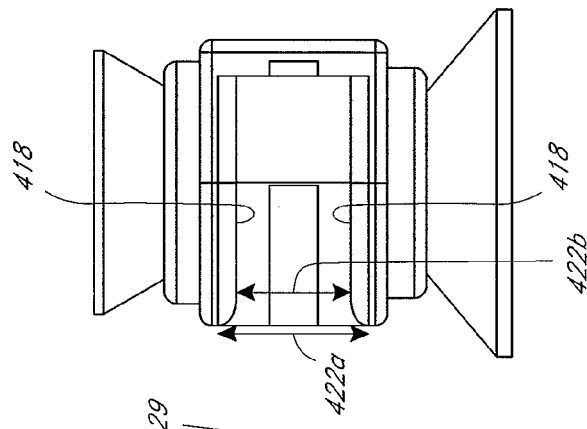
Figure 8G:
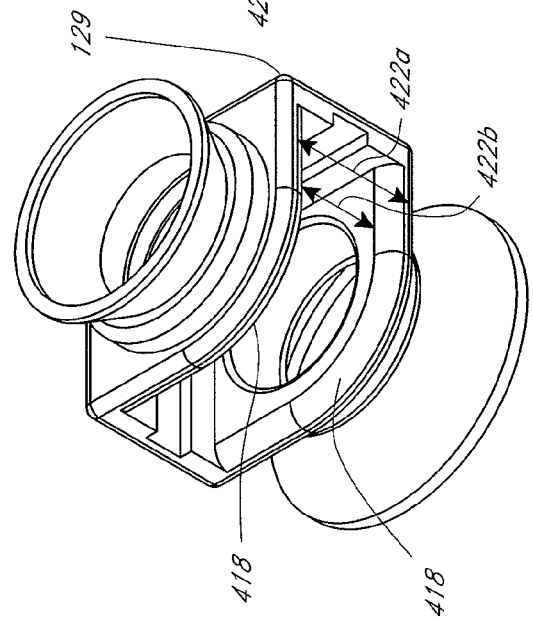

FIGS. 6A-6B illustrate an example of a lens component 302 with a retainer portion 308 that comprises a plurality of attachment arms 304 that include attachment structures, such as hook portions 306, that can partially or completely overhang on a portion of a communication device 306 or that are oriented in a generally transverse direction to the main portion of the attachment arms 304. As illustrated, the attachment arms 304 can be generally tapered from a central, wider portion to a peripheral, narrower portion to provide sufficient structural rigidity and retaining force. The lens component 302 can include the various features of the other lens components 110, 200 described herein. The communication device illustrated in FIGS. 6A-6B is an EVO communication device sold by HTC Corporation. The attachment arms 304 can assist in attaching the lens component 302 to a device, such as the EVO device, in which the camera 310 is not positioned near a corner of the device.

FIGS. 7A-7I illustrate several views of an example of a lens component 400 in which a plurality of lenses 402, 404 can be attached to the same retainer portion 406. In this example, the user can have at least two different options for the type of lens to use in a particular photographic application. For example, one of the lenses 402, 404 can provide a wide-angle view and another one of the lenses 402, 404 can provide a fish-eye view. Many other lens options are possible. For example, one or more lenses can be provided with different color filtering capabilities, different light attenuation capabilities, different lens coatings (such as anti-reflection coatings), and differences in other optical properties to provide multiple user options. Different lenses can include any combinations of these or other optical features. The retainer portion 406 can include various features of the other retainer portions illustrated and described herein.

FIGS. 8A-8I and 9A-9E illustrate several views of an example of a lens component 400a that is similar or identical in many ways to lens component 400 in FIGS. 7A-7I. Lens component 400a includes a channel 416 for receiving a portion of a communication device. The channel 416 includes an attachment-facilitating surface 418. In the illustrated example, the attachment-facilitating surface 418 comprises an inwardly curved (e.g., sloped or slanted) surface positioned along the outer edge or slotted opening of the channel 416. In some embodiments, the attachment-facilitating surface 418 can be positioned at or near an outer edge of the channel 416. As illustrated, the attachment-facilitating surface can be thinner near the edge and can gradually become thicker as it progresses further into the channel 416.

As the lens component 400a is moved into an attachment position on a communication device, the attachment-facilitating surface 418 can provide an initial contact region or opening 420a (see, e.g., FIGS. 8G and 8H) near the outer edge 422 that is effectively wider to facilitate proper orientation and attachment of the device by a user, and a narrower second region 420b further within the channel 416 (or further from the edge of the lens component 400a), thereby providing a more secure attachment surface as the lens component 400a is moved further onto the attachment region of the communication device. In some embodiments, as illustrated, the width of the channel 416 can change between the initial contact region 420a and the second region 420b in a smooth, gradual, and/or curvilinear manner. Some embodiments can include many other types of shapes. For example, the attachment-facilitating surface 418 can include a discontinuous surface or a series of discrete ramps, protrusions, or grooves. An attachment-facilitating surface 418 can be included on any embodiment of a lens component and is not limited to use in the lens component 400a as illustrated in FIGS. 8A-8I and 9A-9E.

Figure 10A:
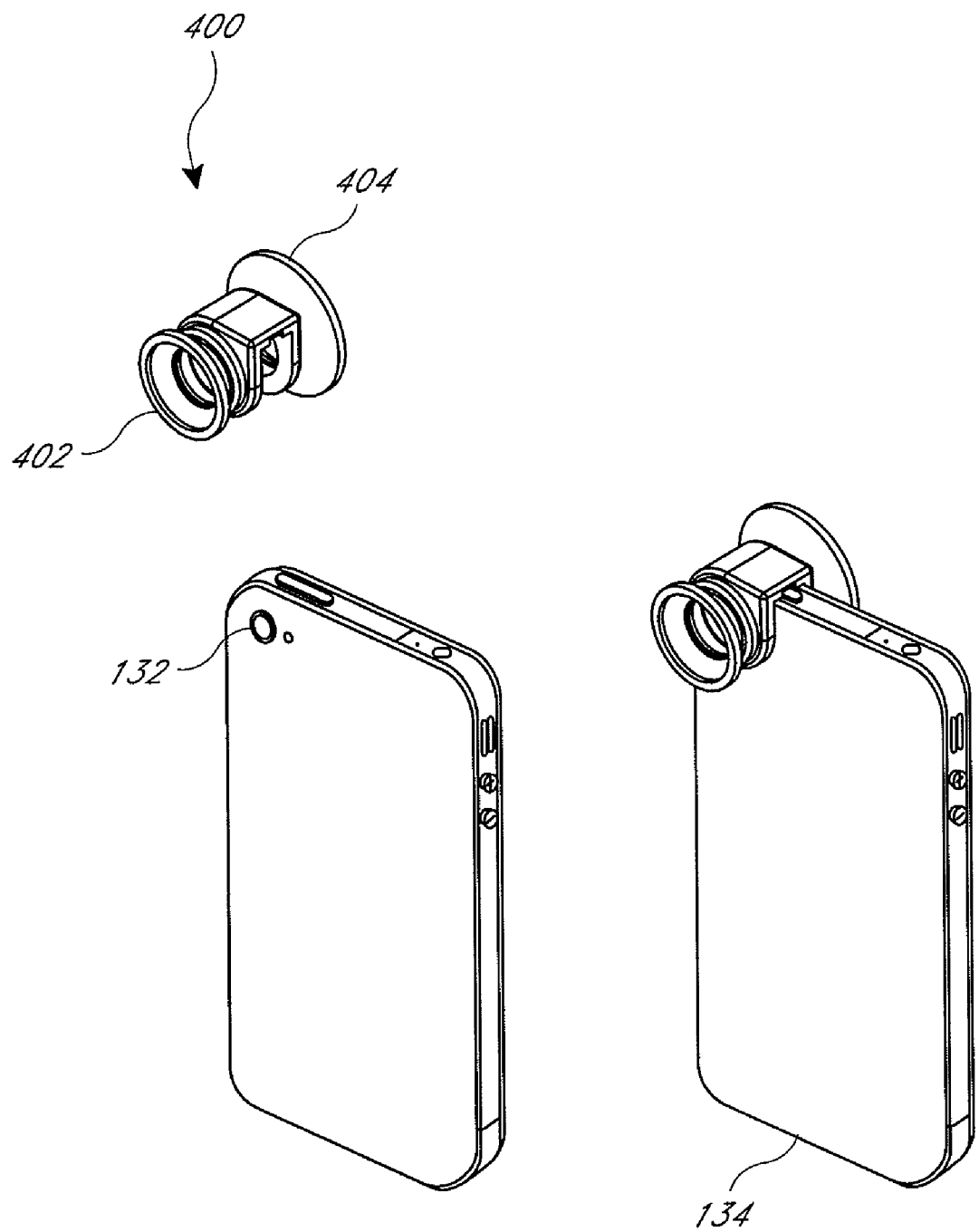
FIGS. 10A-10C illustrate the lens system of FIGS. 7A-7I being attached to an example of a communication device.
Figure 10B:
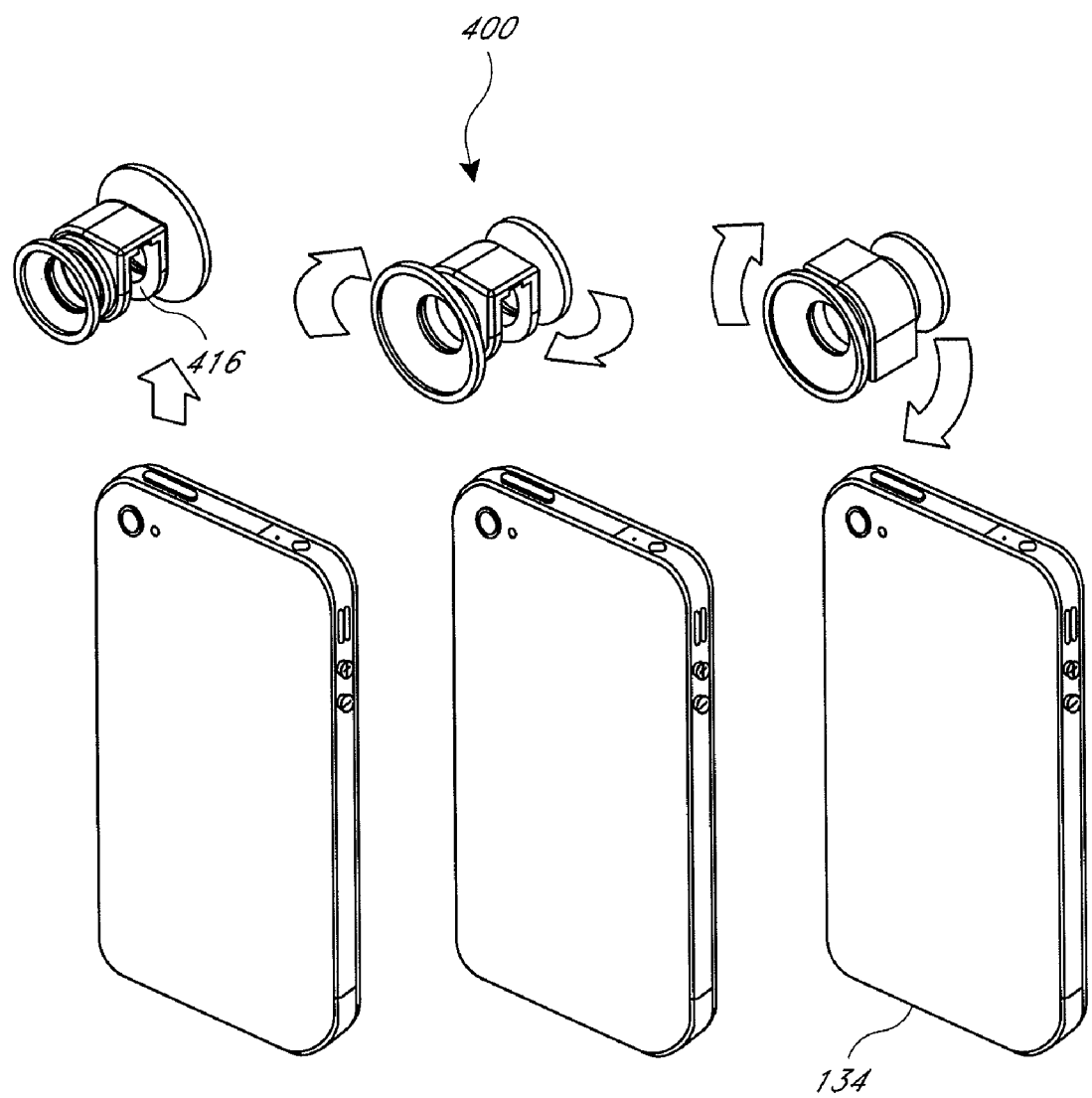
Figure 10C:
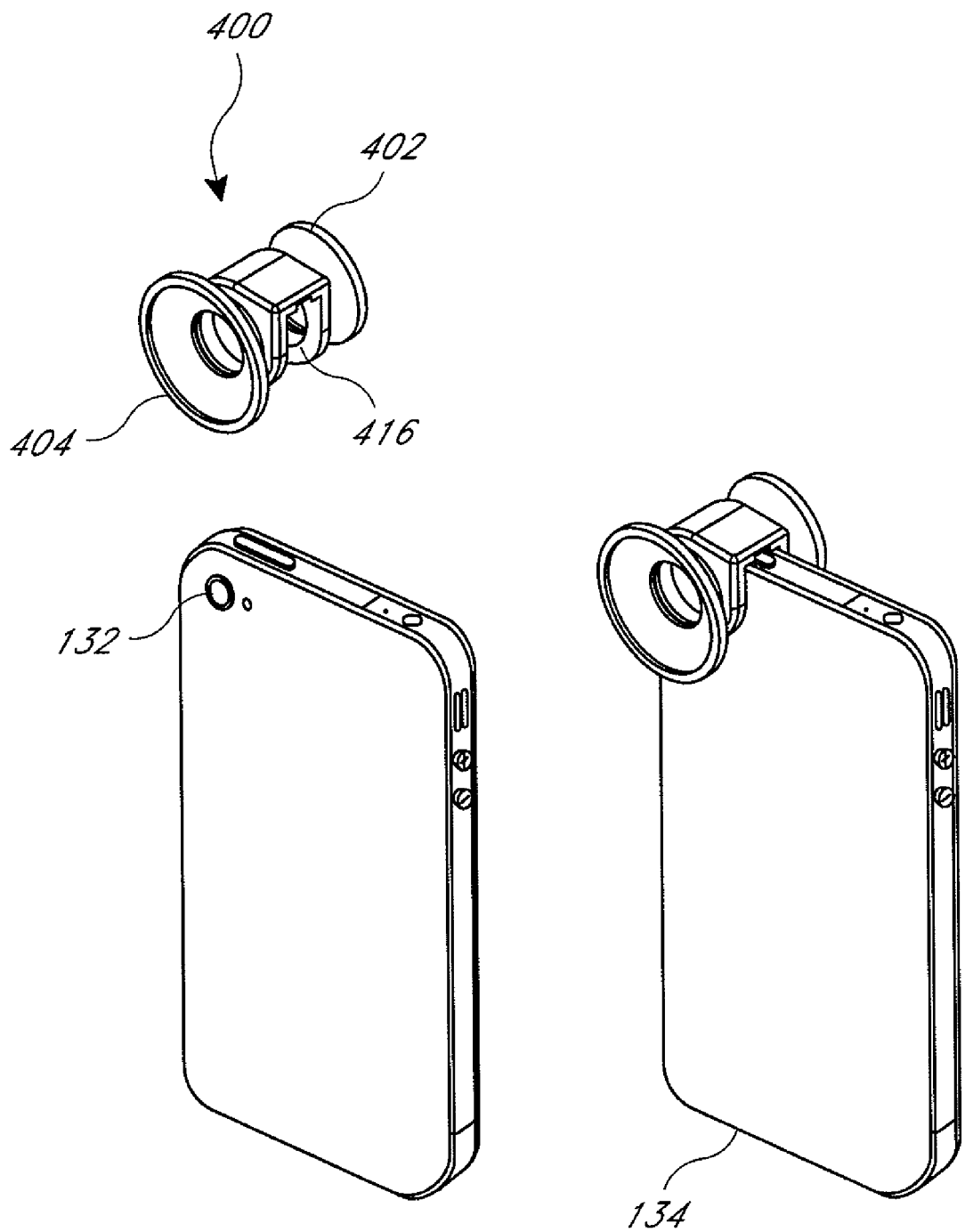

As illustrated in FIGS. 10A-10C, the user can select which of the plurality of lenses 402, 404 to position in front of the camera 132 of the communication device 134 to achieve a desired photographic affect. In FIG. 10A, the lens component 400 is moved into an attachment position on a communication device 134 such that a first (e.g., smaller-diameter) lens 402 is positioned in front of the onboard camera lens 132 and a (e.g., second larger-diameter) lens 404 is positioned on an opposite side of the communication device 134. In this orientation, the smaller-diameter lens 402 is operative and the larger-diameter lens 404 is not operative. In FIG. 10B, the lens component 400 is removed from the communication device, rotated about a vertical axis (e.g., approximately 180° in this example), and rotated about a horizontal axis to orient the channel 416 in general alignment with an attachment surface (e.g., a housing edge) of the communication device. In FIG. 10C, the lens component 400 is again advanced onto the communication device 134 such that the larger-diameter lens 404 is positioned in front of the onboard camera lens 132 and the smaller-diameter lens 402 is positioned on an opposite side of the communication device 134. In this orientation, the larger-diameter lens 404 is operative and the smaller-diameter lens 402 is not operative. In some embodiments, this configuration of a lens component 400 can conveniently permit multiple lens options without necessarily requiring the user to hold or store multiple discreet lens components. In some embodiments, more than two lens types or features can be included in the lens component 400, thereby providing the user with many lens options.

FIGS. 11A-11F illustrate several views of an example of a lens component 500 in which a lens 502 is attached to a retainer portion 504. The lens component 500 can be attached to a communication device 134 in a manner similar to the lens components described above. When the user has attached the lens component 500 to the communication device 134, the user can adjust (e.g., tilt, swivel, or otherwise move) the lens 502 with respect to the communication device 134 (e.g., azimuthally, along the lens's vertical axis, along the lens's horizontal axis, a combination of these adjustments, etc.). The user can shift or otherwise move the lens 502 into a plurality of positions with respect to the retainer to diminish misalignment between the onboard lens in the communication device, or to change the viewing angle of the lens 502, or for some other reasons. In some embodiments, the user can shift of otherwise move the lens 502 into at least a first and a second position, or at least a first, a second, and a third position, or gradually across an adjustment zone. In some embodiments, this adjustment can form a void 506 behind the lens portion 502. The ability to adjust the lens 502 with respect to the communication device 134 can be advantageous in addressing manufacturing differences or tolerances in the location and/or alignment of the onboard camera lenses in some communication devices.

In some embodiments, the tilting of the lens 502 is facilitated by a pivot (not shown) on the portion of the lens facing the communication device 134. The lens 502 is positioned in a channel formed by sidewalls 508 of the retainer portion 504. In FIG. 11A, the lens 502 is tilted to the left with respect to the communication device 134 such that a void 506 is formed between the rear of the lens 502 and a panel of the retainer portion 504 or the communication device 134 when attached, and the exterior walls of the lens portion 502 are non-parallel with the adjacent interior walls of the lens retainer portion 502. As illustrated, the distance between the rear of the lens 502 and an interior edge, line, or cross-sectional region 507 of the retainer portion 504 is greater on a first side 509 than on a second side 511. In this orientation, the lens 502 can compensate for an off-center alignment of the onboard camera of the communication device 134. For example, in the adjusted orientation shown in FIG. 11A, the central axis of the lens portion 502 can be brought into general alignment with the central axis of the onboard camera lens 132. FIG. 11B illustrates the lens 502 in a neutral position with respect to the communication device 134. In this orientation, the lens 502 need not compensate for any off-center alignment of the onboard camera of the communication device 134. FIG. 11C illustrates the lens 502 tilted to the right with respect to the communication device 134, forming a void 506 in a manner similar to FIG. 11A. In this orientation, the lens 502 can compensate for a difference or off-center alignment or location of the onboard camera of the communication device 134.

In some embodiments, the tilting of the lens 502 is facilitated by a ball and socket joint formed by a ball 510 on the portion of the lens 502 facing the communication device 134 and a socket 512 in the retainer portion 504. This embodiment can generally function in a manner similar to the embodiment in FIGS. 11A-11C. The ball portion 510 can approximate the shape of a generally oblate spheroid and can have one or more flat or straight portions. The ball portion 510 can be, but is not required to be, generally spheroid. In the embodiment illustrated in FIGS. 11D-11E, the portion facing the communication device 134 is generally straight or flat. The ball 510 can be positioned within a socket 512 with a generally complementary shape, facilitating rotation of the lens 502 with respect to the retainer portion 502 and communication device 134. In FIG. 11D, the lens 502 is tilted to the left with respect to the communication device 134 such that a void 506 is formed between the ball 510 and socket 512 or the communication device 134. In this orientation, the lens 502 can compensate for miscorrespondence in the alignment or location of the onboard camera of the communication device 134. FIG. 11E illustrates the lens 502 in a generally neutral position with respect to the communication device 134 in which at least one wall of the retainer portion 504 can be generally parallel with either or both of the front or back surfaces of the lens portion 502. In this orientation, the lens 502 need not compensate for any miscorrespondence in the alignment or location of the onboard camera of the communication device 134. FIG. 11F illustrates the lens 502 tilted to the right with respect to the communication device 134, foaming a void 506 in a manner similar to FIG. 11D. In this orientation, the lens 502 can compensate for miscorrespondence in the alignment or location of the onboard camera of the communication device 134 or otherwise help to adjust the nature of the photographic image produced. In the illustrated examples of FIGS. 11D-11F, at least one wall of the retainer portion 504 can be generally non-parallel with either or both of the front or back surfaces of the lens portion 102. As illustrated, the user can appropriately adjust the lens portion 502 with respect to the lens retainer portion 504.

Figure 12:
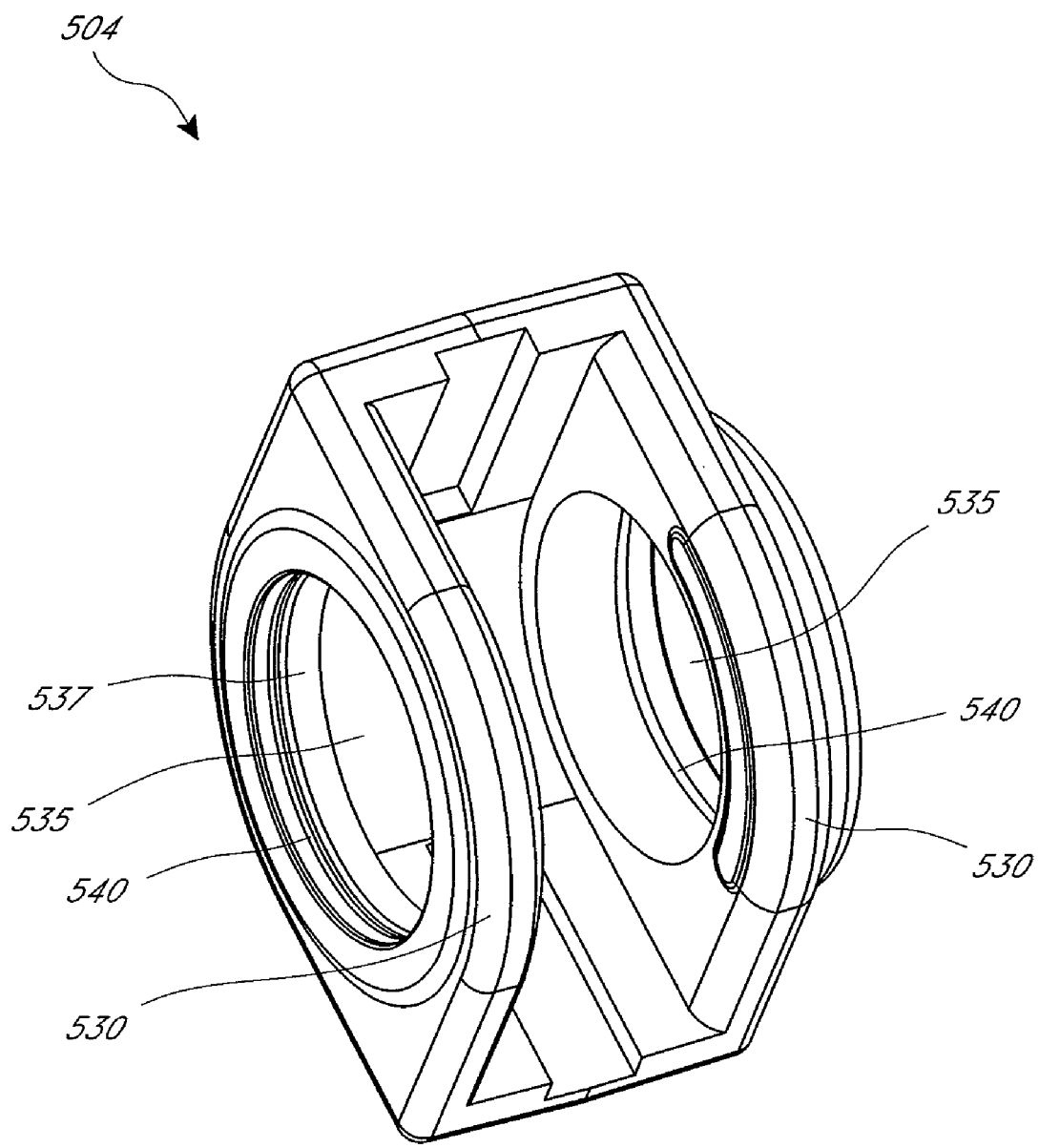
FIG. 12 illustrates an example of a lens retainer portion with an adjustment channel.

As shown in FIG. 12, the lens retainer portion 504 can include one or more generally circular retaining walls 530 for receiving a lens portion 502 in an adjustable manner. The retaining walls 530 can include one or more apertures 535. A radially interior surface 537 of either or both of the apertures 535 can include a first adjustment structure, such as an adjustment channel 540 with a width and depth configured to receive a second adjustment structure on the lens portion 502, such as a ridge or bump. In the illustrated example, the adjustment channel 540 can be substantially smaller in width than the width of the interior surface 537 of the aperture 535 to provide a relatively small amount of restricted movement of the lens portion 502. For example, in some embodiments, the width of the adjustment channel 540 can be less than or equal to about 1.5 mm, and the interior of the adjustment channel 540 can be tapered or beveled toward a generally central portion or line to increase the force required to move the lens portion 502 away from a neutral position. The width of the ridge or bump on the lens portion 502 can be less than the width of the adjustment channel 540, such as less than or equal to about ¾ of the width of the adjustment channel 540. The first and second adjustment structures can fit closely or tightly together (e.g., in a radial interference fit) while permitting limited movement when a force is applied by a user in opposition to frictional forces between the adjustment structures. In this example, the lens portion 502 can be adjusted by a user to move with respect to the lens retainer portion 504 when moved in a deliberate manner, but the lens portion 502 and retaining portion 504 can generally remain in place until another adjustment. In some embodiments, the amount of adjustment can be relatively small, such as greater than or equal to about 0.5 degrees and/or less than or equal to about 2.5 degrees between the orientation of the central longitudinal axis of the lens portion 502 in the original position as compared to the orientation of the central longitudinal axis of the lens portion 102 in the fully adjusted position. In some embodiments, the lens portion 502 can be adjusted to various positions between (or outside of) these points or ranges. The amount of movement between the rear surface of the lens portion 502 and the lens retainer portion 504 can be relatively small as well, such as greater than or equal to about 0.1 mm and/or less than or equal to about 1.0 mm between the original orientation and the fully adjusted orientation.

Figure 13A:
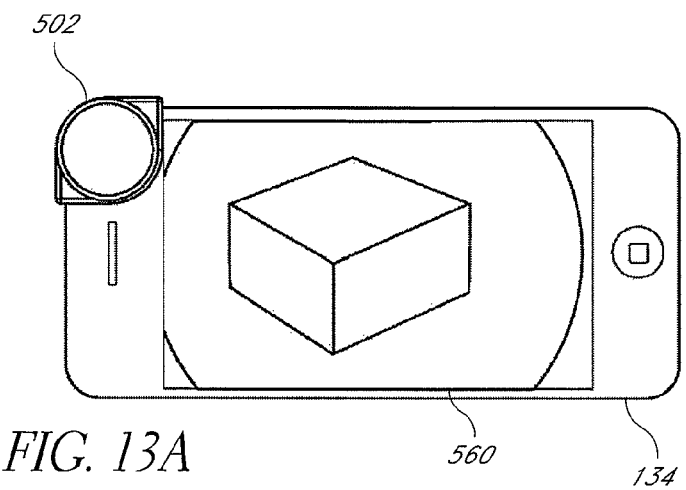
FIGS. 13A-13C illustrate an example of a communication device on which an example of a lens system from FIGS. 11A-11F has been attached.
Figure 13B:
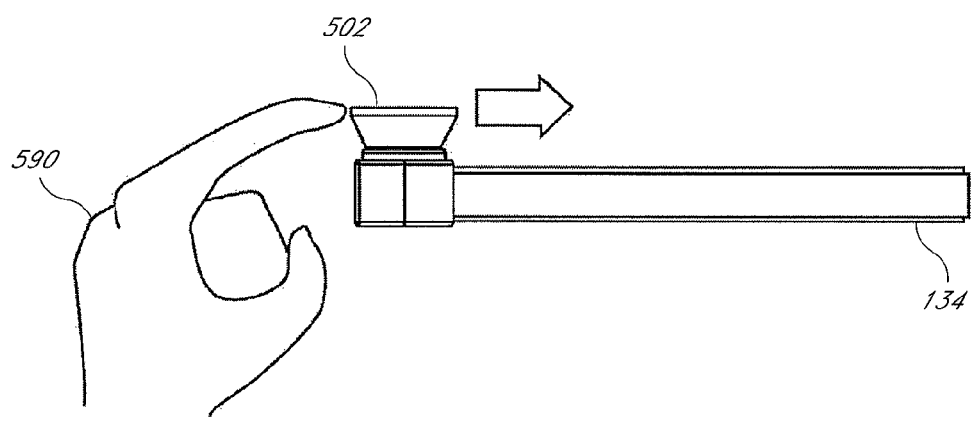
Figure 13C:
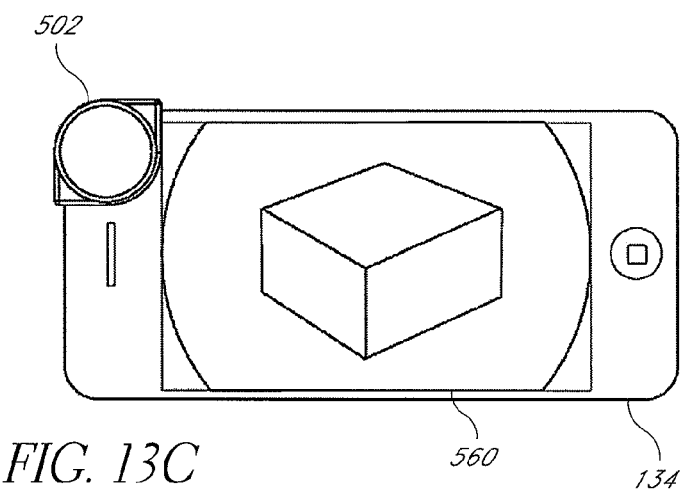

As illustrated in FIGS. 13A-13C, the user can adjust the tilt of the lens 502 with respect to the communication device 134 to improve the alignment or other correspondence between the lens 502 and the onboard camera of the communication device 134. In FIG. 13A, the lens 502 is in a neutral position with respect to the communication device 134. The image on the screen 560 of the communication device 134 is off-center to the left, as evidenced by the leftward orientation of the vignetting which would normally be centered about the image. FIG. 13B shows the user 590 tilting the lens 502 to the right to compensate for the off-center image on the communication device 134. FIG. 13C illustrates the corrected image, with the vignetting centered about the image even though the onboard camera of the communication device is not aligned properly. In some embodiments, the tilt of the lens 502 can be adjusted while the user 590 is viewing a live image from the onboard camera on the screen 560 of the communication device 134, providing real-time feedback to the user about whether the correct adjustment is being made.

Figures 14A, 14B:
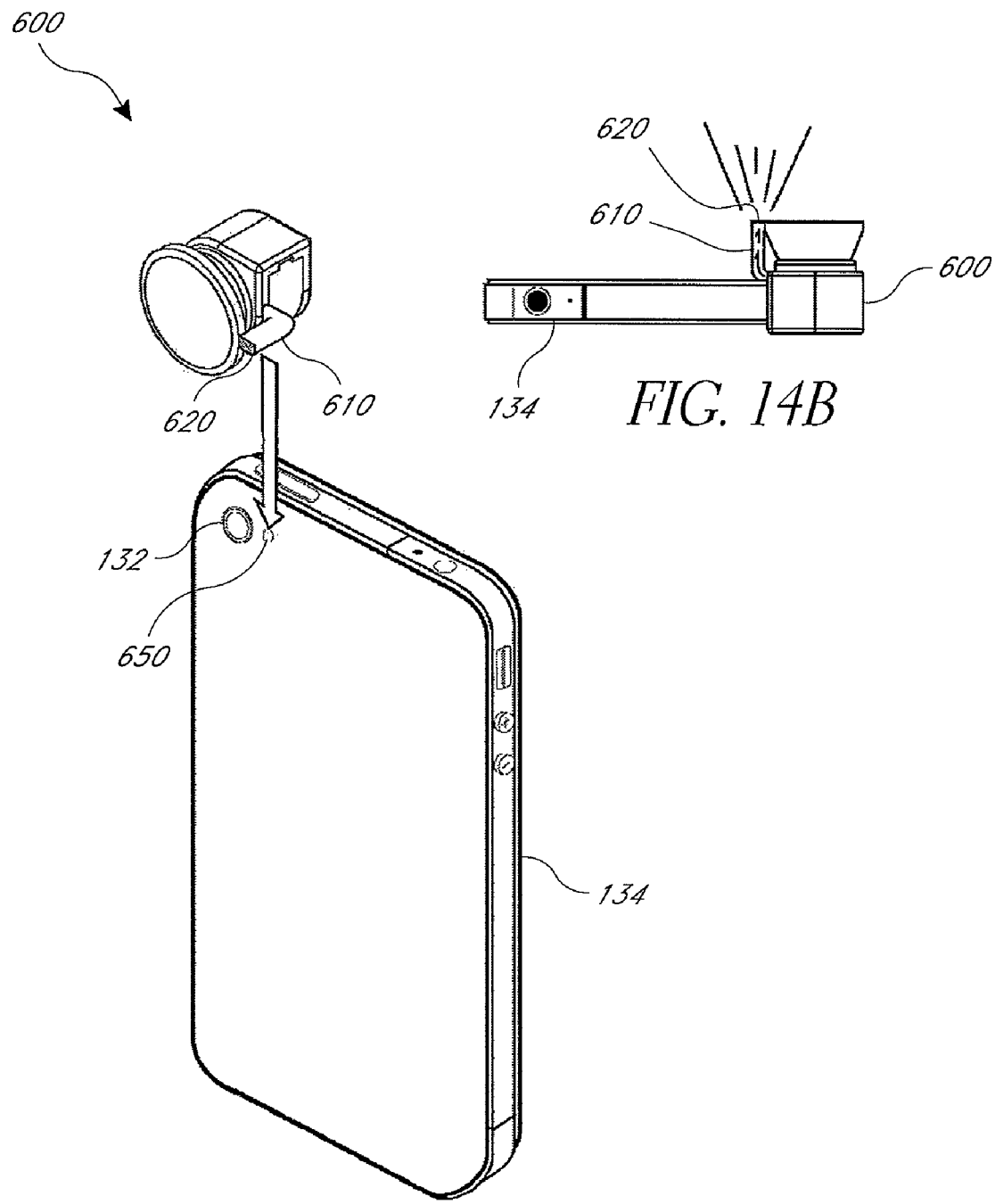
FIGS. 14A-14B illustrate an example of a communication device with a light enhancement component on a lens system.

FIGS. 14A-14B illustrate two views of a lens component 600 with a lens portion 630 and a light-enhancing feature, such as a light pipe 610. The light pipe 610 can be mounted to the retainer portion 660 or to some other portion of the lens component 600. The light pipe 610 conveys light from a light source, such as a flash, to an exit point 620 so that it may illuminate the area to be photographed. In some embodiments, the light pipe 610 is made from material which facilitates conveyance of light from the flash to the area to be photographed. In some embodiments, the interior of the light pipe 610 is lined with material which facilitates conveyance of light from the onboard flash to the area to be photographed. The position of the flash 650 on the communication device 134 illustrated in FIGS. 14A-14B is close enough to the onboard camera 132 that the lens component 600 generally covers or otherwise obstructs the flash 650 when it is attached to the communication device 134. In some circumstances, this may prevent light from the flash 650 from enhancing photographs taken when the lens component 600 is attached. The light pipe 610 conveys the light from the flash 650 to the exit point 620, and from there the light travels normally to illuminate the area in front of the camera.

In some embodiments, the light pipe 610, retainer portion 660, and/or some other portion of the lens component 600 can be configured to generally or entirely surround the flash 650 and/or other region from which light emanates to inhibit or prevent undesirable light transfer or leakage outside of the pathway from the onboard flash into the light pipe 610. Such an undesirable transfer or leakage may include light from the onboard flash moving into the rear side of the lens portion 630 of the lens component 600 or light from the onboard flash moving outside of the region between the retainer portion 660 of the lens component 600 and the communication device.

In some embodiments, the retainer portion 660 or another component can be formed from various materials, including polymers (e.g., polycarbonate), metals (e.g., aluminum), etc., or some combination thereof. For example, at least a portion of the retainer portion 660 can be formed using a multi-step molding process, such as multi-shot injection molding, inserting molding, or overmolding, and/or the retainer portion 660 can include a coating, such as an adhesive, paint, or deposited film, to provide a region on the interior and/or exterior of the retainer portion 660 that has a different durometer or appearance than another portion of the retainer portion 660. In some embodiments, a harder shell or exterior can be provided in conjunction with a softer interior surface. For example, an interior region of the retainer portion 660 that is intended to be positioned in contact with the corner of the communication device can comprise a surface that is softer and/or more tacky than an exterior region or a supporting region of the retainer portion 660. In some embodiments, the softer or more tacky surface can provide an enhanced light seal by compressing against the communication device to inhibit or prevent light leakage.

Figures 15A, 15B:
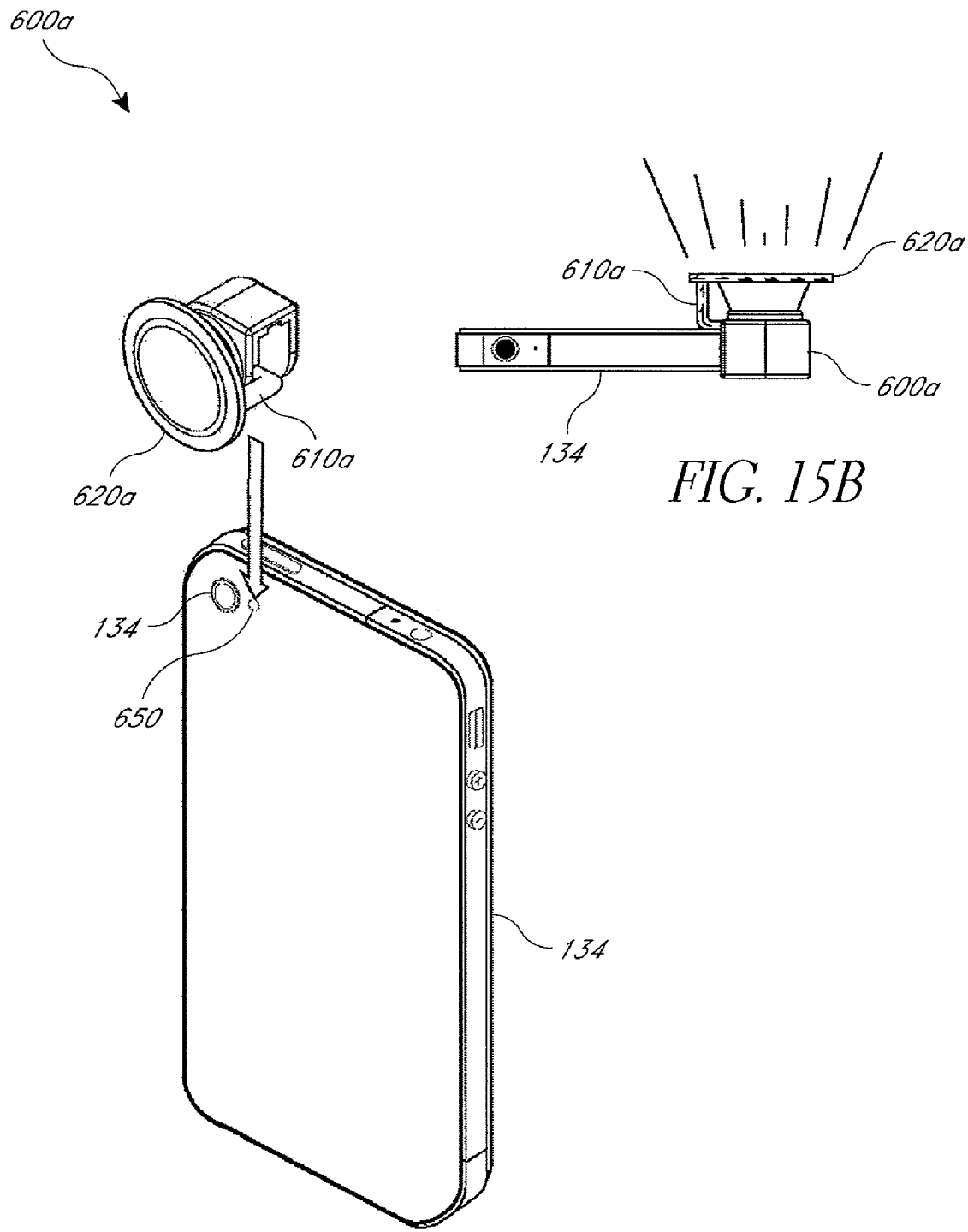
FIGS. 15A-15B illustrate an example of a communication device with another light enhancement component on a lens system.
Figures 16E, 16F:
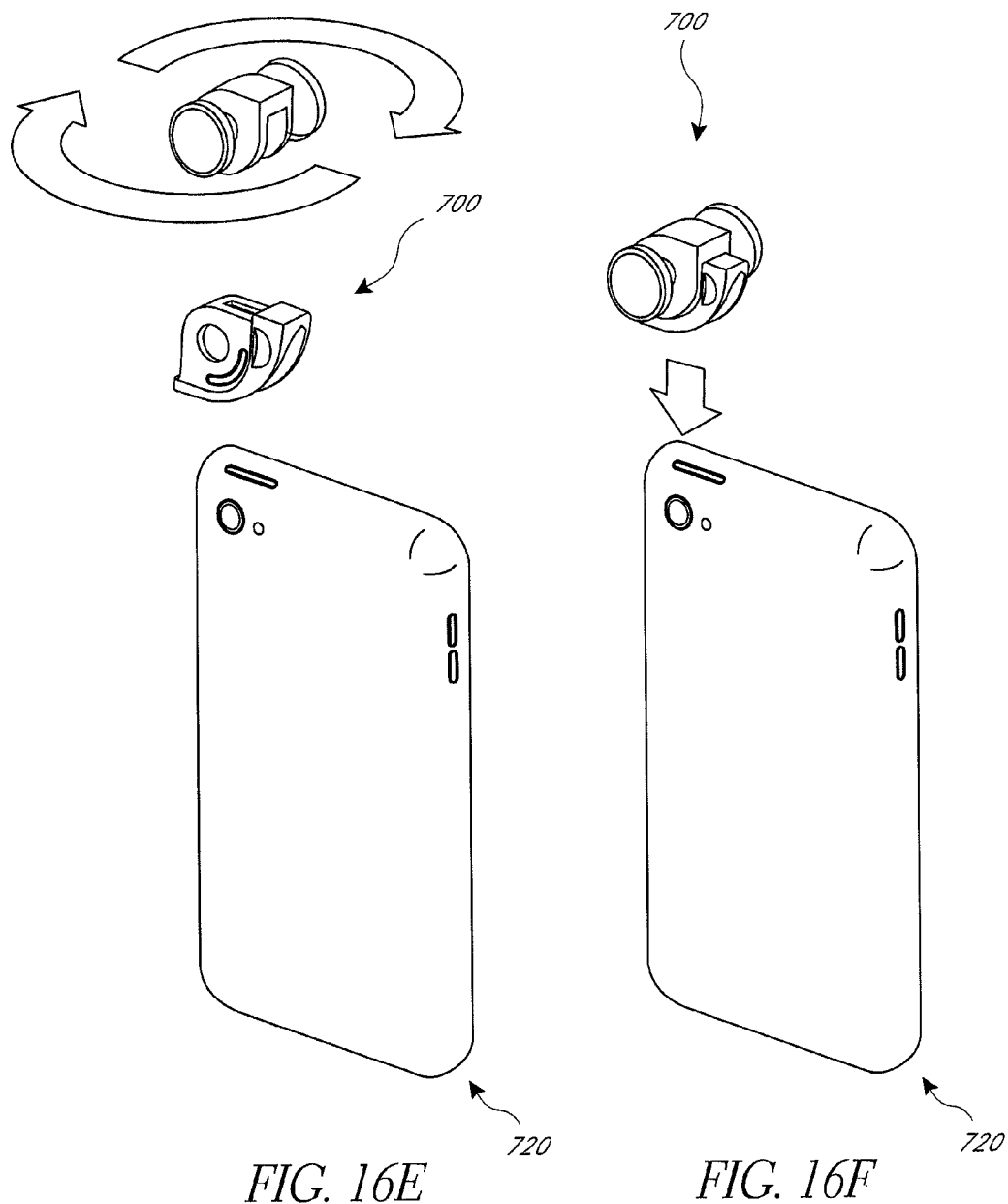

FIGS. 15A-15B illustrate two views of a lens component 600a with a light pipe 610a. In many respects, the light pipe 610a is similar or identical to the light pipe 610 described above. The exit point 620a of the light pipe 610a can generally or completely surround the lens 630a, providing a generally ring-shaped flash. This can be particularly desirable for use in macro (or close-up) photography. The light-enhancing feature can also be provided by a flash or other light source on the lens component 600, without requiring use or connection with an onboard flash.

In some embodiments, a light-enhancement feature can include an externally attachable flash component connected to the lens component 110 that can be selectively configured to be in electronic communication with the communication device (e.g., by way of a wireless protocol such as the Bluetooth® protocol, or by way of a wired connection such as a USB or serial connection, etc.). The flash can be powered by and/or actuated by the communication device. In some embodiments, the flash can pivot, tilt, or otherwise move with respect to the retainer portion 112 to direct light as desired by the user.

In some embodiments, as illustrated and described herein, lens components can include retainer portions with attachment structures configured to be removably attached to communication devices, even when the communication devices themselves are generally smooth or flat and do not have corresponding attachment structures in the region near the onboard camera. In this way, the communication devices are not required to be permanently or temporarily modified, reconfigured, defaced, or otherwise altered in appearance to permit attachment of the lens components. In some embodiments, this arrangement can permit uninterrupted and unobstructed, normal use of the communication device when the lens component is removed. However, in some embodiments, modifications to the communication devices may be useful or necessary to attach the lens components.

FIGS. 16A-16F illustrate views of a lens system 700. The lens system 700 can include a lens component 702. The lens component 702 can be similar to other lens components described herein. For example, the lens component 702 can comprise similar or identical structures as lens component 400 or 400a. The lens component 702 can include one or more lenses 704, 706 that are attached to (e.g. releasably coupled to, or integrally formed with) the same retainer portion 708. With more than one lens, the user can have at least two different options for the type of lens to use in a particular photographic application. For example, one of the lenses 704, 706 can provide a wide-angle view and another one of the lenses 704, 706 can provide a fish-eye view. The retainer portion 708 can include various features of the other retainer portions illustrated and described herein. For example, the retainer portion 708 can include a channel 709.

The lens system 700 can further include an adaptor 710. The adaptor 710 can comprise a separate or independent piece from that of the lens component 702. The adaptor 710 can include a first adaptor connection portion 712. The first adaptor connection portion 712 can be configured to be removably attachable to a communication device 720 that has a shape that is different from the standard communication device to which the lens component 702 is normally configured to attach, for example as shown in FIG. 16D. The first adaptor connection portion 712 can include a channel 714. The channel 714 can be sized and/or shaped to correspond to the size and/or shape of at least a portion of the communication device 720, such that the adaptor 710 can slide over a portion (e.g. a corner) of the communication device 720, and be held in place on the communication device 720 (e.g., by way of a friction fit).

The adaptor 710 can further include a second adaptor connection portion 716. The second adaptor connection portion 716 can be sized and/or shaped such that it is received within the channel 709 on the lens component 702. The second adaptor connection portion 716 can include at least one opening 718 to permit optical communication between the lens 704, 706 and a corresponding onboard camera 722 on the communication device 720.

The adaptor 710 and lens component 702 can be positioned such that the lens 704, 706 is positioned in a region generally covering or near the onboard camera 722 in the communication device 720 to enable the lens 704, 706 to cooperate optically with the onboard camera, to provide optical enhancements, improvements, modifications, and/or alternatives. In some embodiments, as illustrated, the adaptor 710 and lens component 702 are shaped so as to attach to the communication device 720 in a region and in a manner that permits a user to see a viewing portion of the communication device 720 without obstruction or without appreciate obstruction.

The lens component 702 can be removably attached to the adaptor 710 in a variety of manners. For example, the lens component 702 can be attached solely via a friction fit between the retainer portion 708 and the second adaptor connection portion 716. In some embodiments, the lens component 702 can snap into place on top of the adaptor 710. Other attachment options are also possible.

The adaptor 710 can allow the lens component 702 to be used with one or more different communication devices. For example, the adaptor 710 can allow the lens component 702 to be used with a communication device that is different in size, thickness, and/or shape than one that the lens component 702 is typically designed for. For example, in some embodiments, the communication device 720 can comprise an iPod Touch device, manufactured by Apple, Inc., and another communication device 134 can comprise an iPhone, also manufactured by Apple, Inc. The iPhone is typically larger, and thicker, than the iPod Touch. If the lens component 702 is designed and sized to specifically fit onto the iPhone, but not onto the iPod Touch, the user can conveniently and simply use the adaptor 710 in order to use the lens component 702 with the communication device 720.

Figure 17A:
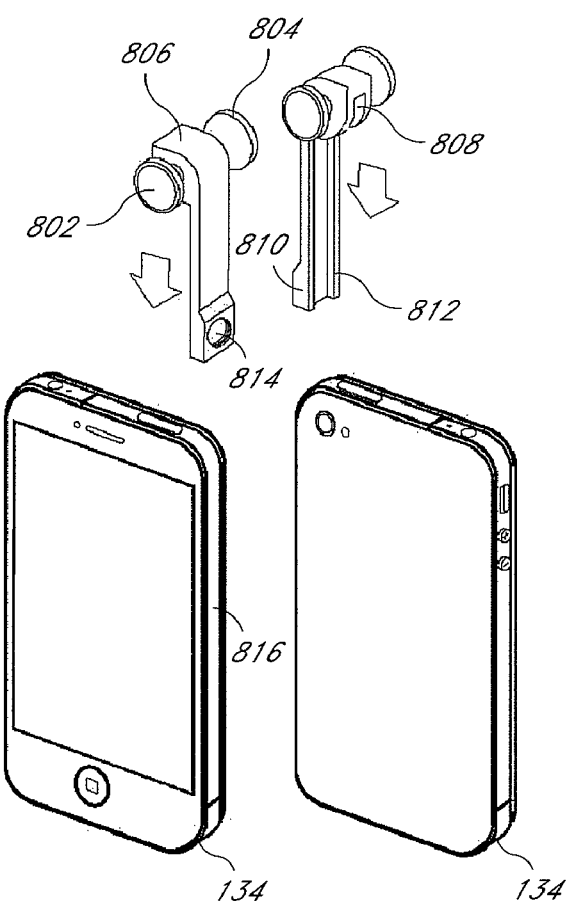
FIGS. 17A-17B illustrate an example of a lens component that includes a mount feature.
Figure 17B:
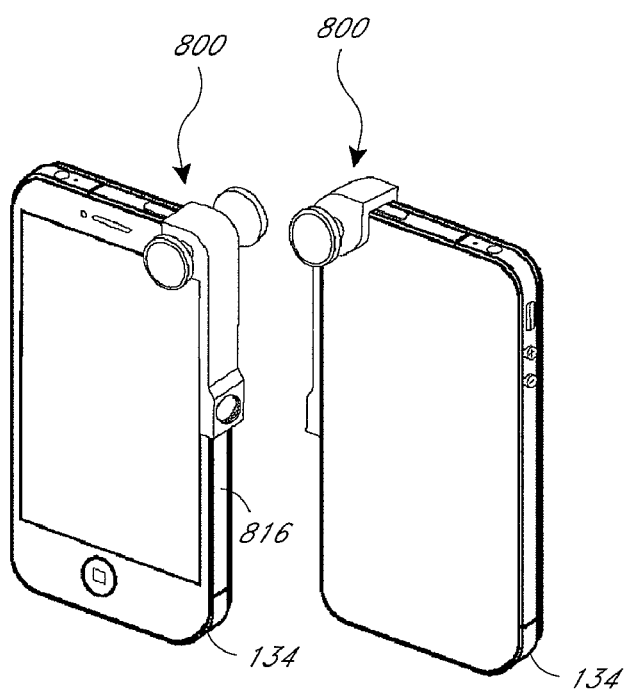

FIGS. 17A-17B illustrate an example of an attachment component 800 for use in applications where a communication device is intended to be mounted temporarily on a support structure to take a photo or video. The attachment component 800 can include one or more lenses 802, 804 that are attached to the same retainer portion 806. The retainer portion 806 can include a channel 808, similar or identical to the channels described above, for attaching the attachment component 800 to a portion (e.g. corner) of the communication device 134. In some embodiments, the retainer portion 806 can further include stabilizing or securing members such as at least one or more elongate ridges 810, 812. The elongate ridges 810, 812 can extend away from the lens 802, 804, and can be used to grasp onto and/or hold the attachment component 800 in place on the communication device 134. In some embodiments, as illustrated, the width of the elongate ridges 810, 812 is less than the thickness of the communication device to which the lens component is configured to attach and the elongate ridges 810, 812 extend across the front viewing surface of the communication device along a narrow front edge and terminate before obscuring any appreciable portion of the viewing area. The retainer portion 806 can also include a connector opening 814 at one end of the attachment component 800.

As illustrated in FIG. 17B, the attachment component 800 can be attached to the communication device 134 (e.g. iPhone), such that the elongate ridges 810, 812 extend over and grasp onto a side edge 816 of the communication device 134. The ridges 810, 812 can help to hold the attachment component 800 in place on the communication device 134. Other types of structure, other than ridges 810, 812 can also be used.

Figure 18A:
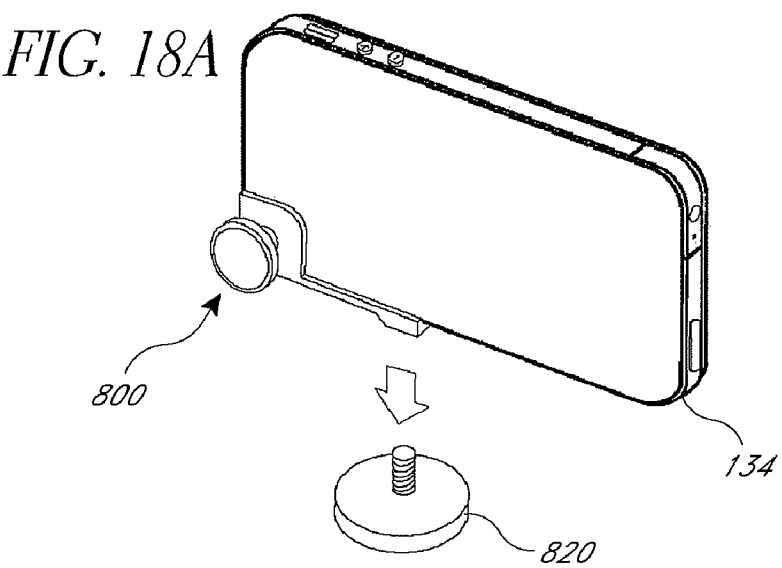
FIGS. 18A-18C illustrate the lens component of FIGS. 17A-17B configured for mounting to a tripod.
Figures 18B, 18C:
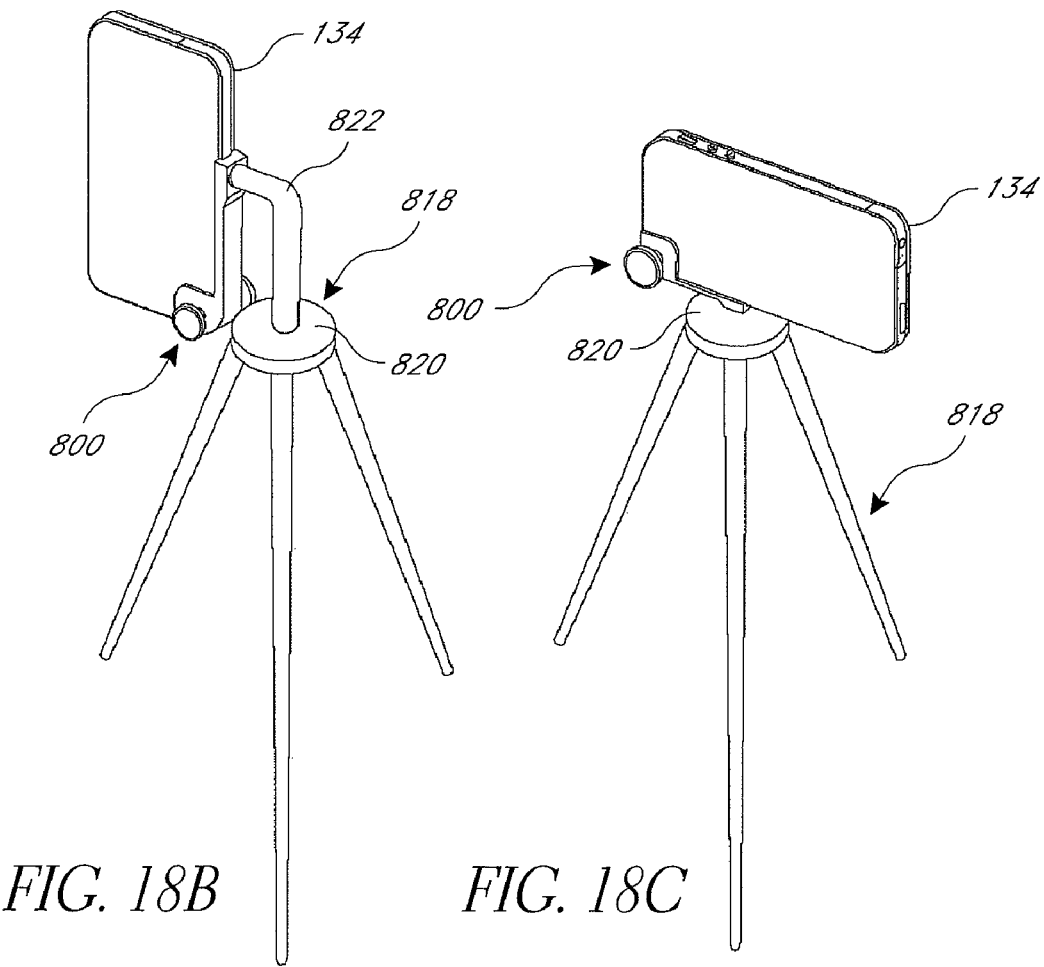

As illustrated in FIGS. 18A-18C, the attachment component 800 can be attached to a support structure 818 (e.g. a tripod). For example, attachment component 800 can be attached to a base portion 820 of the support structure 818. The base portion 820 can be screwed into, or otherwise attached to, the retainer portion 806 of the attachment component 800. In some embodiments the connector opening 814 can include internal threading, and the base portion can include a screw or other structure that has external threads, such that the base portion 820 can be screwed into the connector opening 814. Other types of connection are also possible, including a snap-fit or other type of connection mechanism that permits a quick, releasable connection between the attachment component 800 and the support structure 818.

In some embodiments, the base portion 820 of the support structure 818 can either include, or be connected with, a mounting arm 822. In some embodiments the retainer portion 806 of the attachment component 800 can comprise the mounting arm 822. The mounting arm 822 can be used to adjust the position of the communication device 134. For example, as illustrated in FIG. 18C, without the mounting arm 822, the communication device 134 is in a generally horizontal or landscape position on top of the support structure 818, whereas with the mounting arm 822, as illustrated in FIG. 18B, the communication device 134 is positioned to a side of the base portion 820, and is in a vertical position. Other types of mounting arms or structures are also possible. In some embodiments, as illustrated, the attachment component 800 comprises one or more lenses, and in some embodiments, the attachment component 800 has no lenses.

Figure 19A:
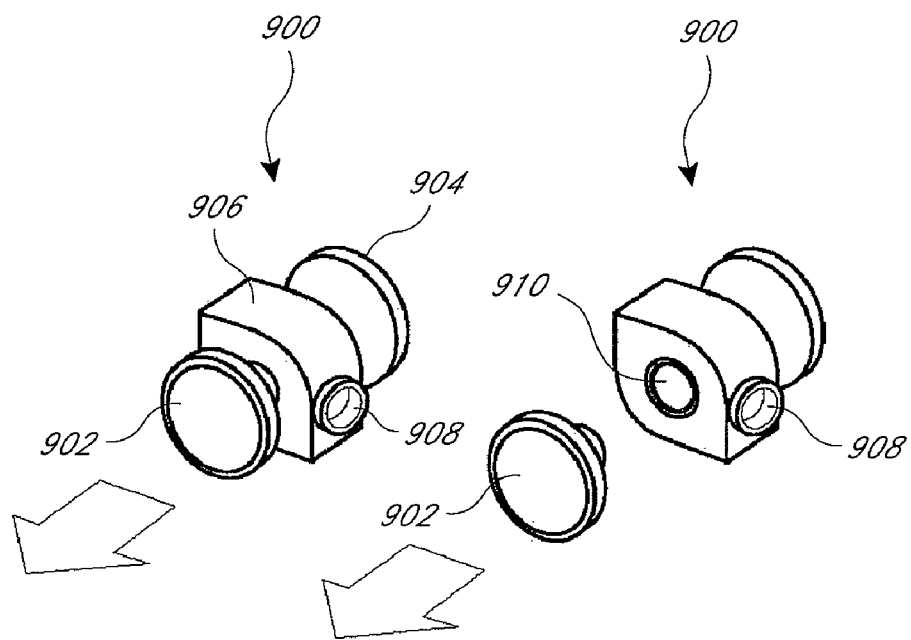
FIGS. 19A-19C illustrate an example of a lens component that includes a storage or attachment feature along the side of the lens component for storing a lens or other device.
Figure 19B:
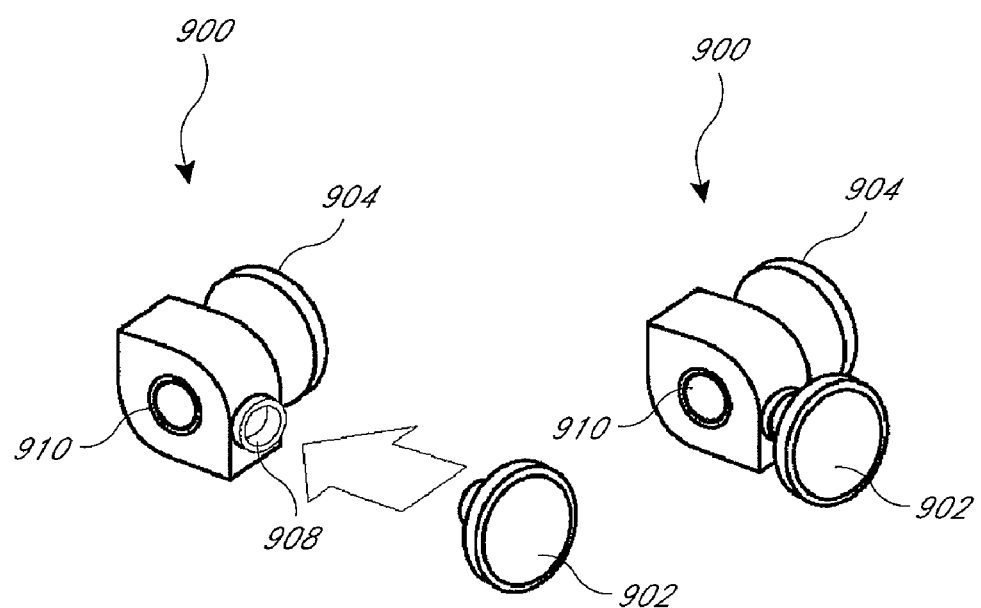
Figure 19C:
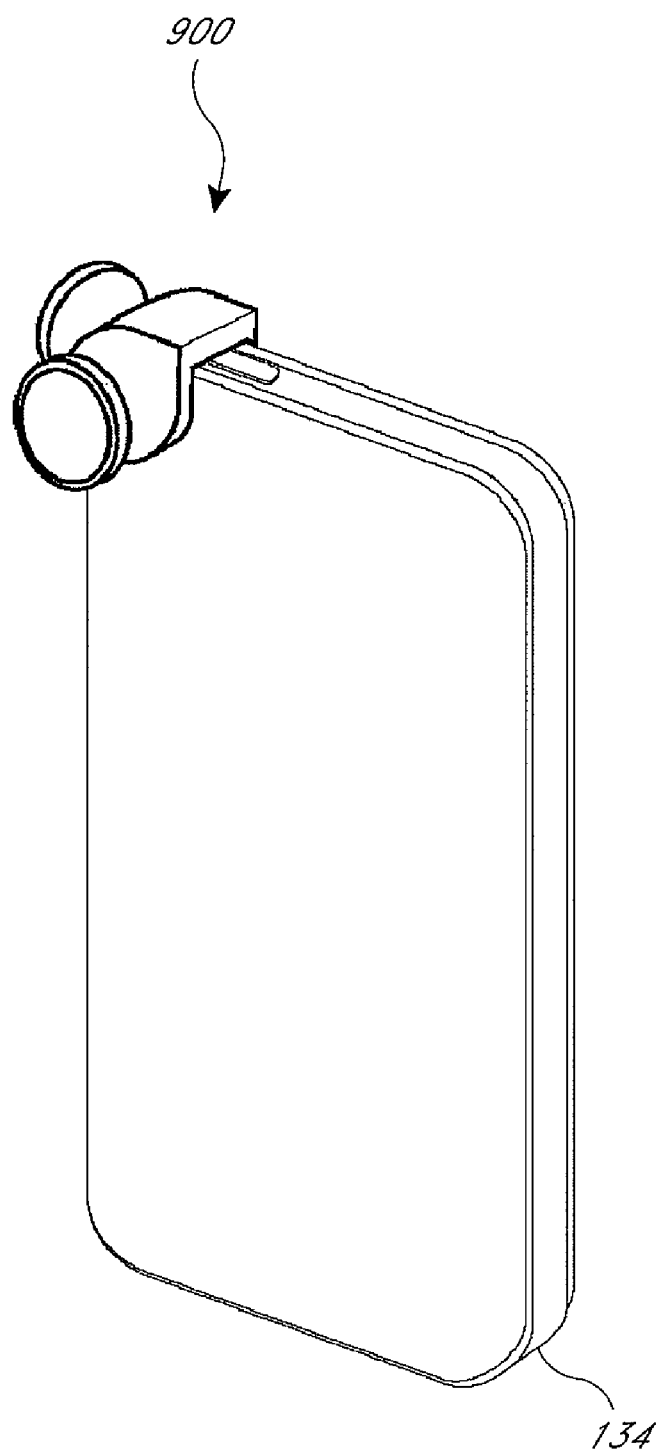

FIGS. 19A-19C illustrate a lens component 900 that permits storage of additional lenses, lens caps, or other devices. The lens component 900 can include one or more lenses 902, 904 that are attached to the same retainer portion 906. The retainer portion 906 can include a channel (not shown), similar to the channels described above, for attaching the lens component 900 to a portion (e.g. corner) of the communication device 134.

The lens component 900 can further include at least one attachment feature 908. The storage attachment feature 908 can comprise an opening, ridge, button, or other structure located generally orthogonally along the lens component 900 that is configured to contact, hold, and/or receive a device. For example, the attachment feature 908 can comprise an opening configured to receive a portion of lens 902. The storage attachment feature 908 can be located on the retainer portion 906. The storage attachment feature 908 can attach (e.g. releasably attach) to a plurality of different sized lenses, including but not limited to lenses 902 and/or 904 as illustrated. The storage attachment feature 908 can also, or alternatively, releasably attach to a lens cap (not shown), or other types of devices.

In some embodiments, the storage attachment feature 908 can permit one or more devices (e.g. lenses) to be stored and/or carried along a side of the lens component 900 until needed for use. When a device is needed for use, the device can be removed from the storage attachment feature 908, and attached along a different area of the lens component 900. For example, in some embodiments, and as illustrated in FIG. 19A, the lens 902 can be removed from an opening 910 along the retainer portion 906. The opening 910 can include threads or other structure generally for holding the lens 902. Once removed, the lens 902 can be attached to the storage attachment feature 908 along the side of the lens component 900, as illustrated in FIG. 19B. At such time, a different lens can then be inserted into the opening 910 if desired. Once the lens 902 is needed again, the lens 902 can be removed from the storage attachment feature 908, and again placed back into the opening 910.

Figure 20:
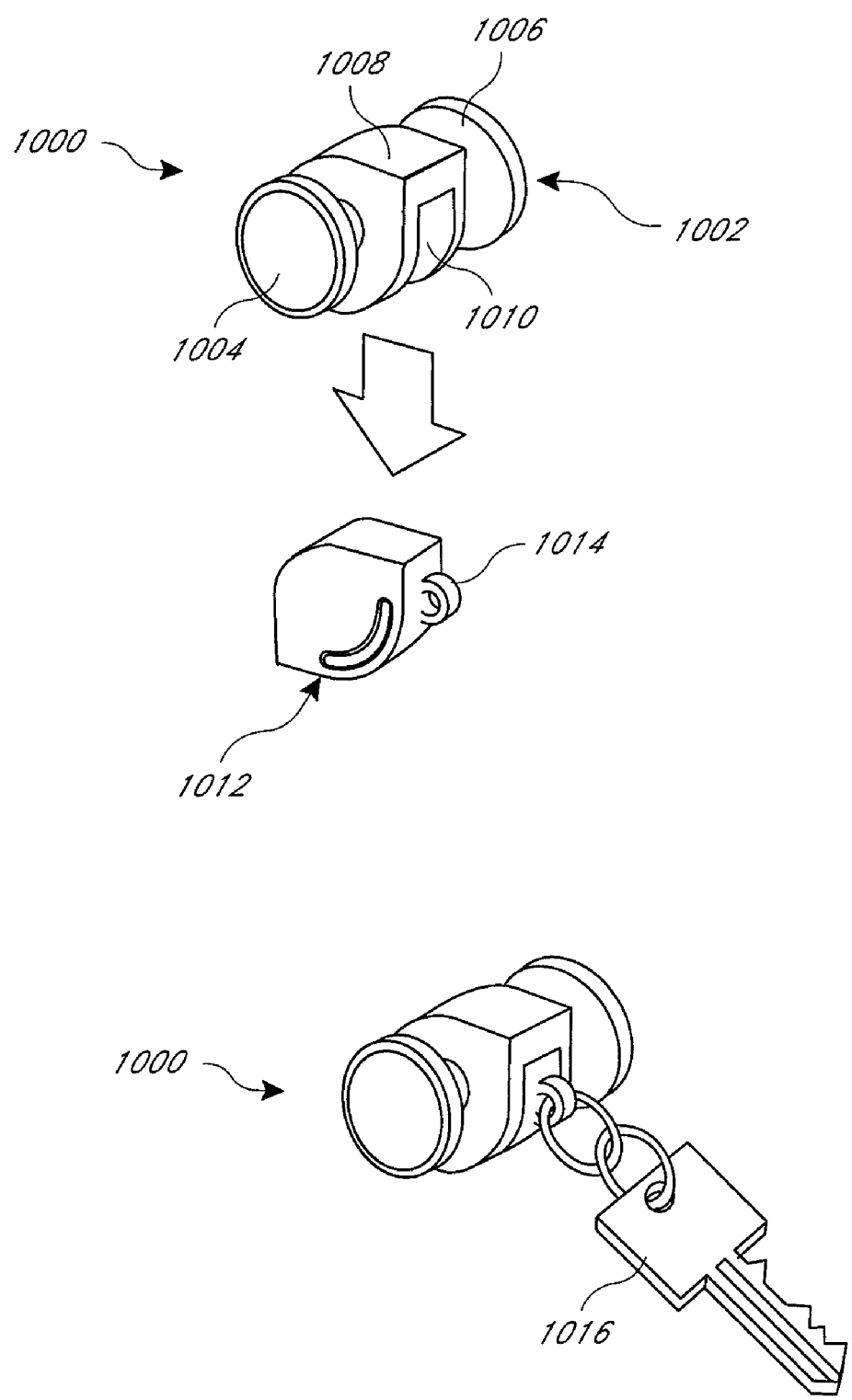
FIG. 20 illustrates examples of a lens system that includes an attachment to be used with an accessory such as a keychain.
Figure 21:
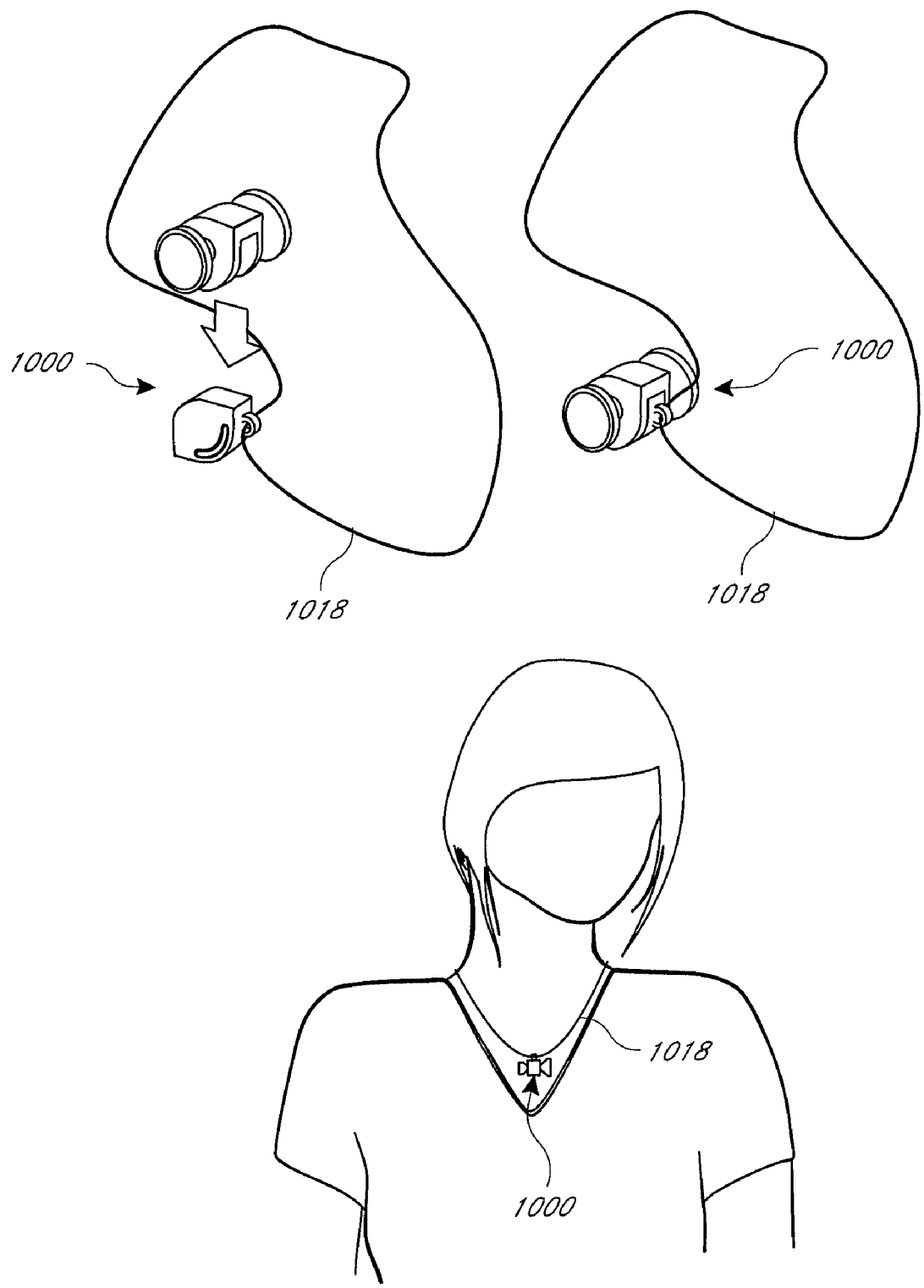
FIG. 21 illustrates examples of a lens system that includes an attachment to be used with an accessory such as a necklace.
Figure 22:
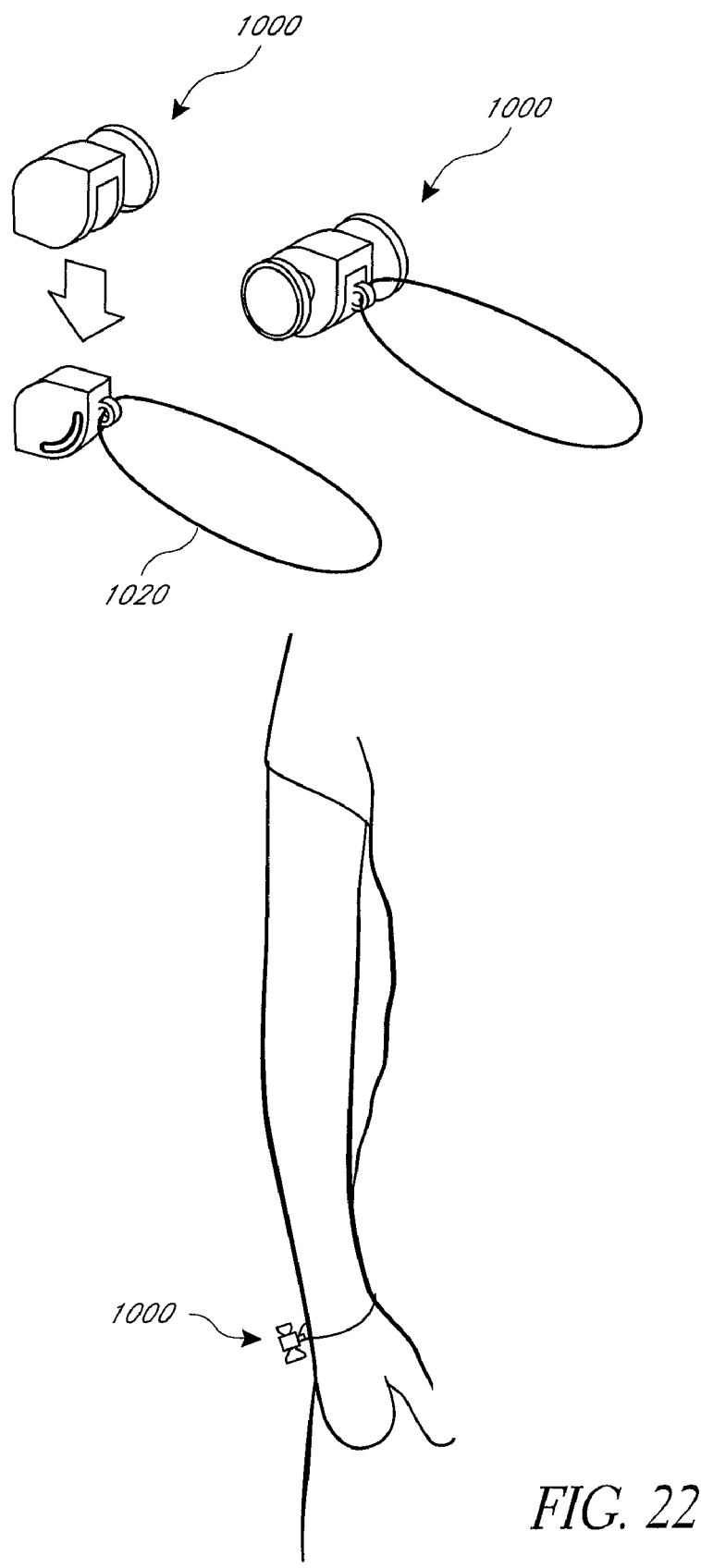
FIG. 22 illustrates examples of a lens system that includes an attachment to be used with an accessory such as a bracelet.

FIGS. 20-22 illustrate examples of a lens system 1000 that are used with person-carried accessories such as keys, necklaces, bracelets, or other devices. The lens system 1000 can include a lens component 1002. The lens component 1002 can be similar or identical to any of the lens components described herein. For example, the lens component 1002 can be similar to lens component 400 or 400a. The lens component 1002 can include one or more lenses 1004, 1006 that are attached to the same retainer portion 1008. The retainer portion 1008 can include various features of the other retainer portions illustrated and described herein. For example, the retainer portion 1008 can include a channel 1010.

The lens system 1000 can include an attachment component such as a plug 1012. The attachment component can be configured to remain on or connected with a person-carrier accessory, while the lens component 1002 can be selectively detached during use. The plug 1012 can be sized and shaped so as to be received by the channel 1010. The plug 1012 can include one or more accessory attachment features 1014. The accessory attachment feature 1014 can comprise, for example, a small ring or half-ring that protrudes from the rest of the plug 1012. The accessory attachment feature 1014 can be attached to a set of keys 1016, necklace 1018, bracelet 1020, or any other similar device.

The lens system 1000 can allow a user to wear and/or carry the lens component 1002 with him or her, in an easy and convenient manner. The lens component 1002 can be quickly removed from the plug 1012 and used with a communication device, such as one of the communication devices described herein, and then returned again to the plug 1012 and/or keys 1016, as illustrated in FIG. 20, necklace 1018 as illustrated in FIG. 21, bracelet 1020 as illustrated in FIG. 22, etc. once the user is done.

FIGS. 23A-23E illustrate an example of a lens system 1100 that can be used to reduce lens flare and protect a lens. The lens system 1100 can include a lens component 1102. The lens component 1102 can include structures that are similar or identical to the lens components described herein. For example, the lens component 1102 can be similar to lens component 110. The lens component 1102 can include one or more lenses 1104 that are attached to the same retainer portion 1106. The retainer portion 1106 can include various features of the other retainer portions illustrated and described herein. For example, the retainer portion 1106 can include a channel (not shown).

The lens system 1100 can further include a lens hood 1108. The lens hood 1108 can be a separate piece that is configured to attach to the lens component 1102. The lens hood 1108 can comprise an opening 1110 configured to fit over the lens 1104. The lens hood 1108 can comprise flared portions 1112, 1114 that extend away from the opening 1110. The flared portions 1112, 1114 can be configured to provide protection for the lens 1104, so as to reduce lens flare.

Figure 23A:
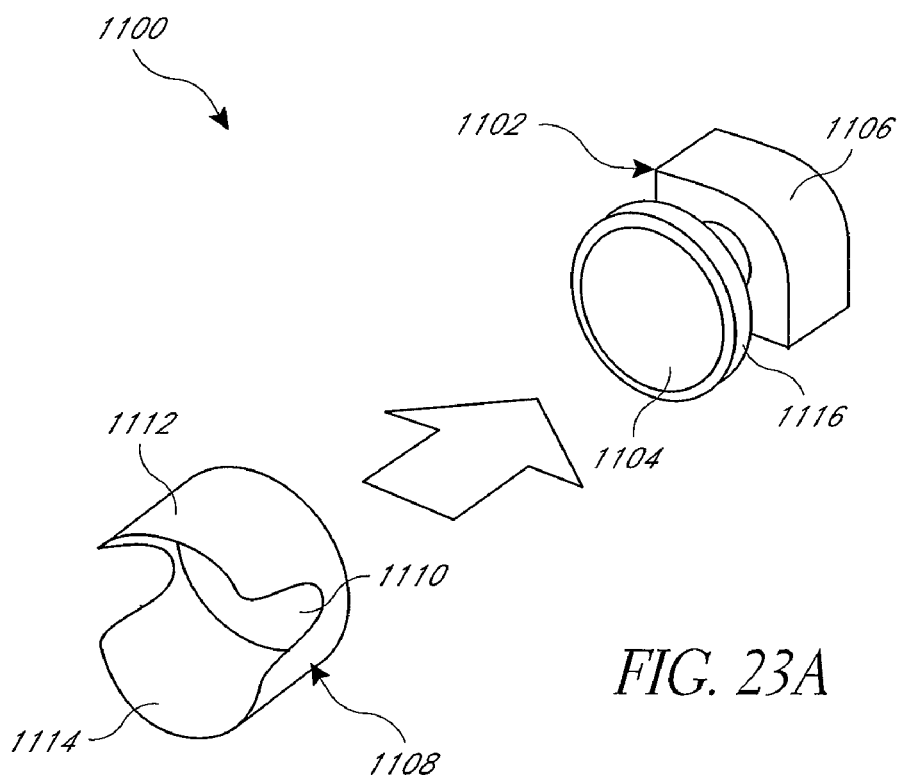
FIGS. 23A-23E illustrate an example of a lens system that includes a lens hood.
Figure 23B:
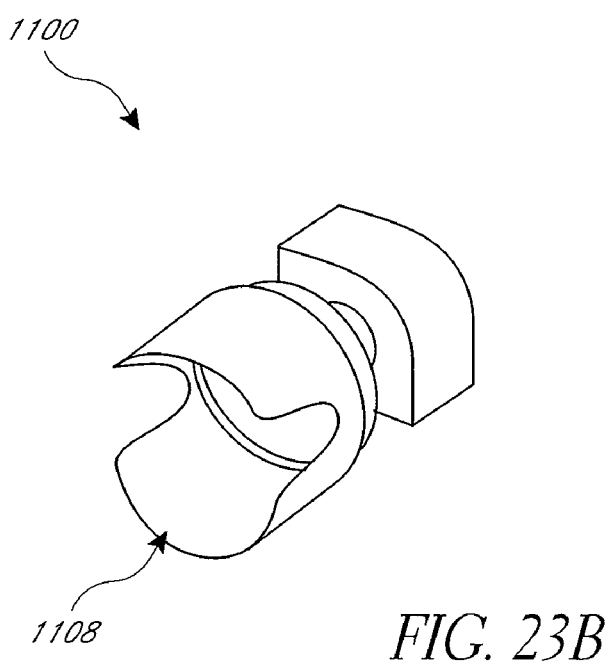
Figure 23C:
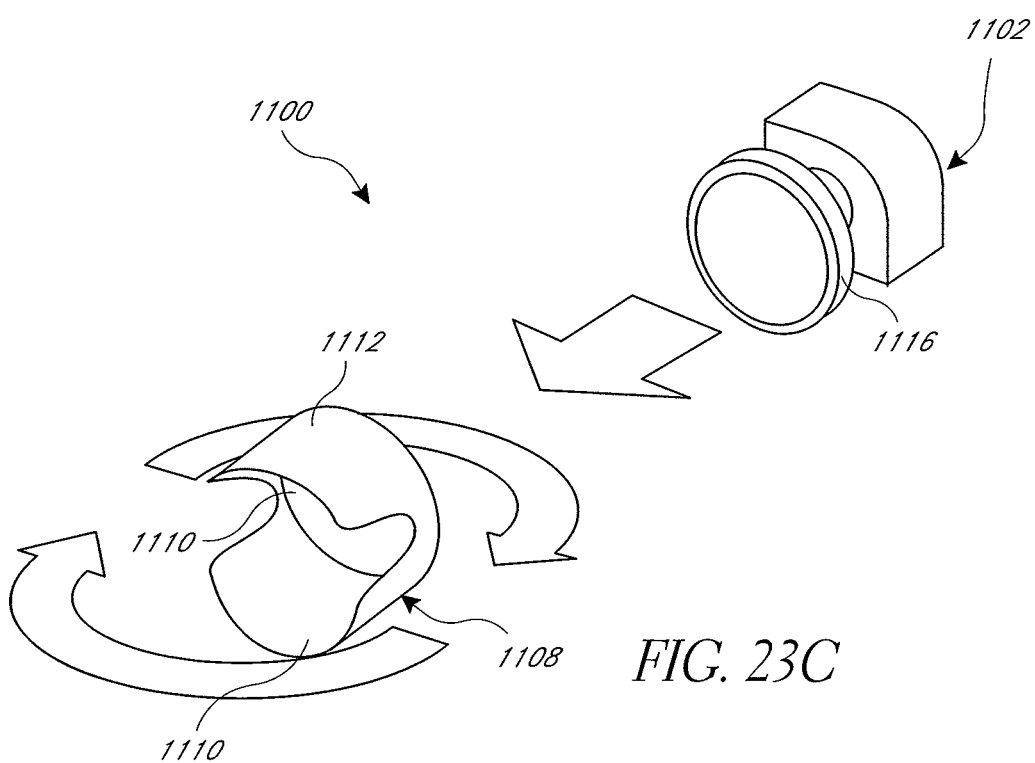
Figure 23D:
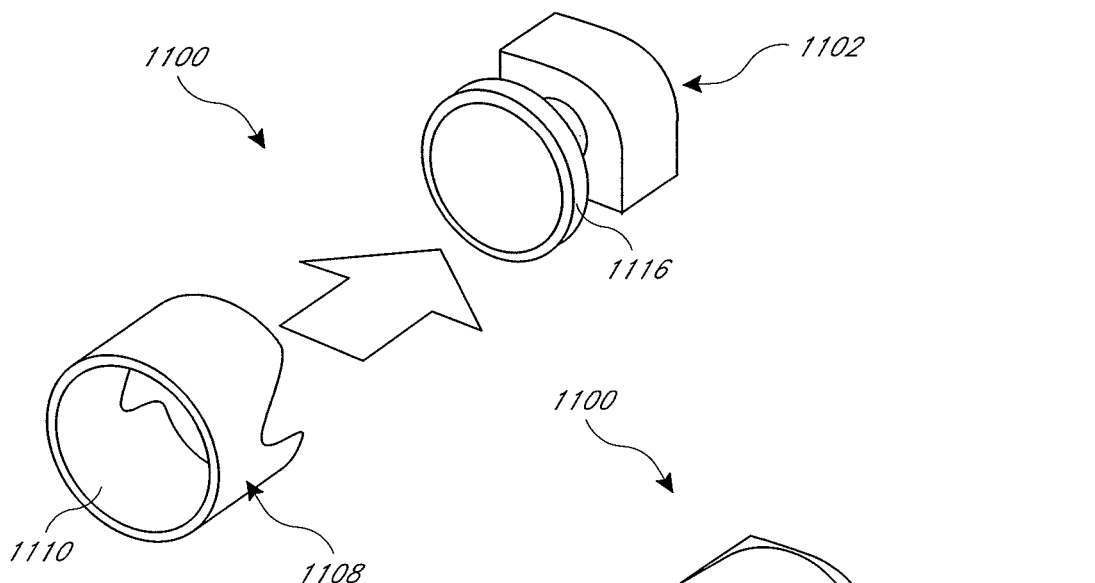
Figure 23E:
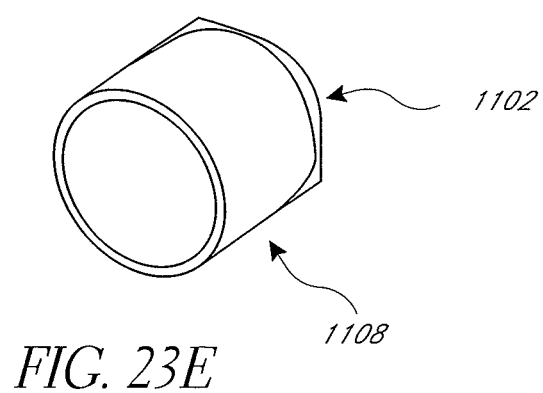
Figure 24A:
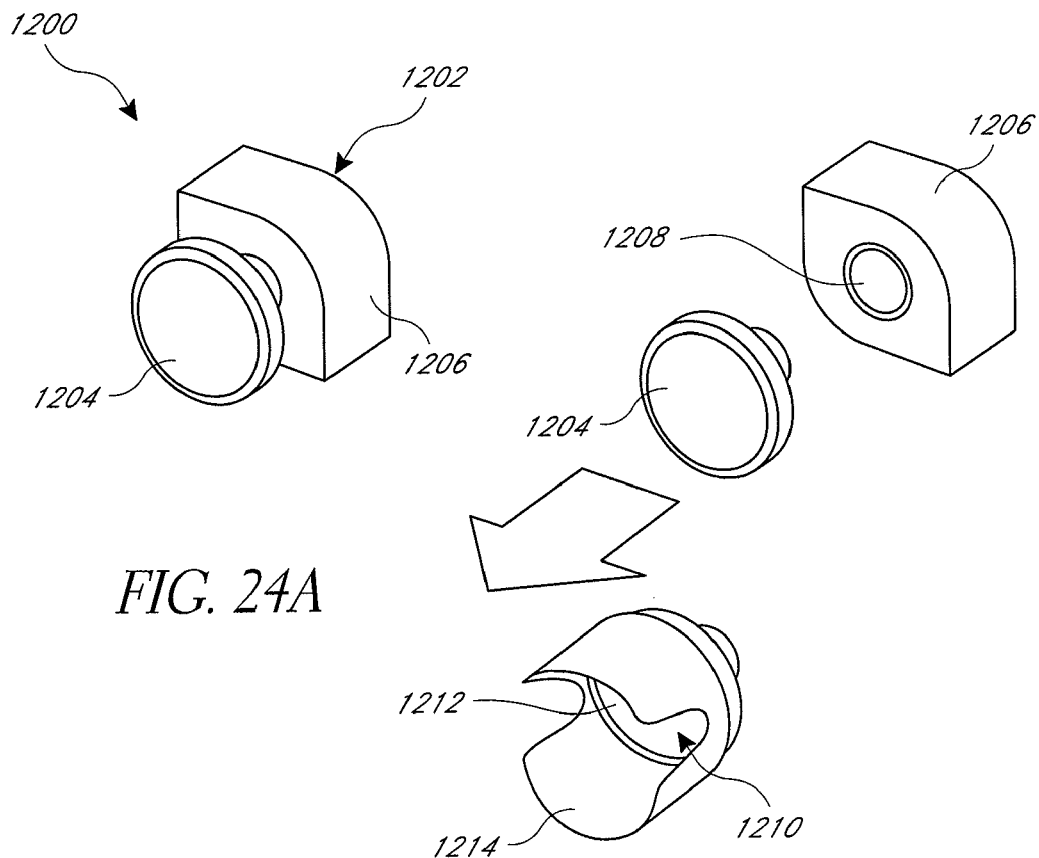
FIGS. 24A-24D illustrate an example of a lens system that includes detachable lenses.
Figure 24B:
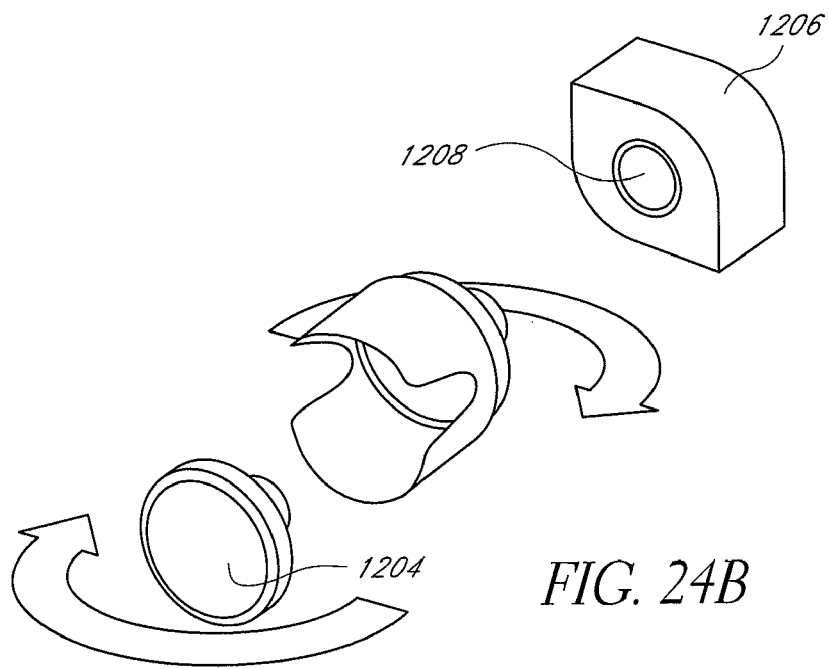
Figure 24D:
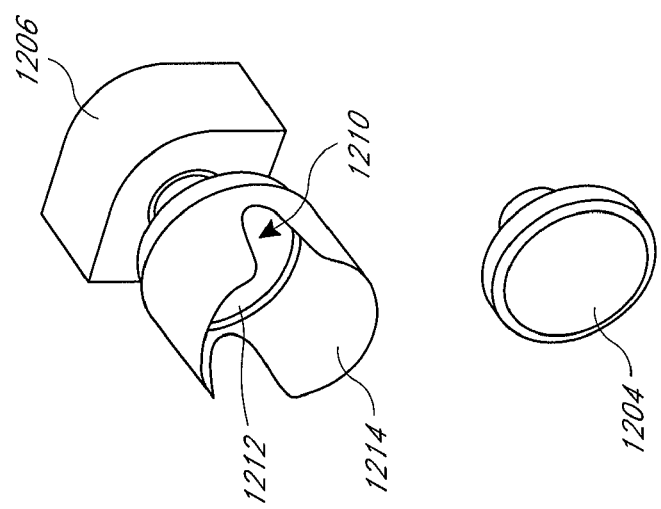
Figure 24C:
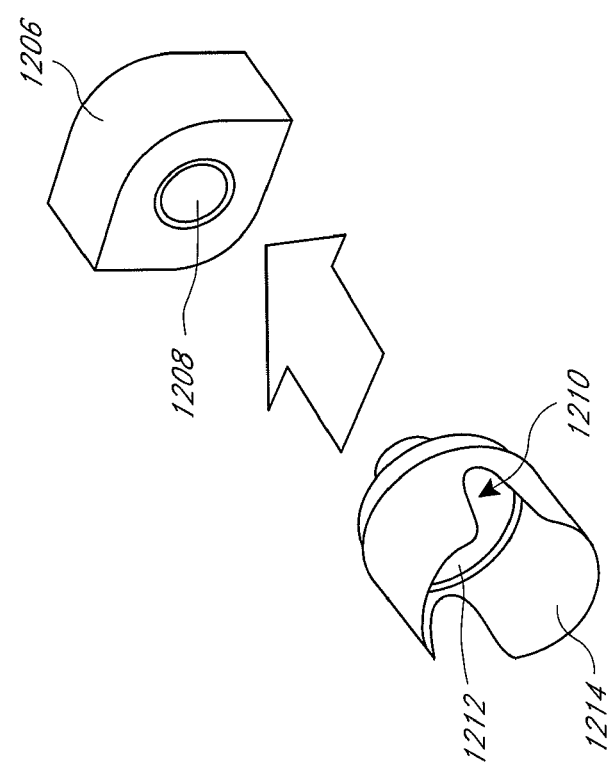

In use, the lens hood 1108 can be releasably attached to the lens 1104, for example by simply sliding the opening 1110 of the lens hood 1108 over an edge 1116 of the lens 1104. The lens hood 1108 can be held in place via friction fit, though other connection mechanisms are also possible. Once attached, the flared portions 1112, 1114 can be positioned as desired by twisting or rotating the lens hood 1108. The flared portions 1112, 1114 can then protect the lens 1104 while the lens 1104 is in use. Once the lens 1104 is no longer in use, the lens hood 1108 can be removed from the lens component 1102, turned around 180 degrees, as illustrated in FIGS. 23C-23E, and placed back over the lens 1104. In this position, the lens hood 1108 can not only be easily stored for future use, but can also help to protect the lens 1104 and/or lens component 1102 from damage and/or wear.

FIGS. 24A-24D illustrate an example of a lens system 1200 that can include a selectively attachable and detachable lens or a plurality of different selectively attachable and detachable swappable lenses. The lens system 1200 can include a lens component 1202. The lens component 1202 can be similar to one of the lens components described herein. For example, the lens component 1202 can be similar to lens component 110. The lens component 1202 can include one or more lenses 1204 that are attached to the same retainer portion 1206. The retainer portion 1206 can include various features of the other retainer portions illustrated and described herein. For example, the retainer portion 1206 can include a channel (not shown).

As described above, the lens system 1200 can include the ability to swap lenses. Thus, the lens component 1204 can be removably attached to the retainer portion 1206. For example, the retainer portion 1206 can include a lens attachment portion 1208. The lens 1204 can be removably attached to the retainer portion 1206 at the lens attachment portion 1208. For example, the lens attachment portion 1208 can comprise an opening with threads, and the lens 1204 (or other lens) can be screwed into the opening 1208, or the lens can snap-fit or otherwise simply be pushed into the opening 1208. Other connection mechanisms are also possible. For example, the lens can be temporarily locked in with a bayonet mount, or a magnetic mount or other structure can be used.

The lens system 1200 can further include one or more additional lens components, such as a second lens component 1210. In some embodiments, the second lens component 1210 can comprise a lens 1212 with a lens hood 1214. The second lens component 1210 can be a separate piece that is configured to attach to the retainer portion 1206, similar to lens 1204. For example, the second lens component 1210 can be attached to the lens attachment portion 1208. Thus, depending on user preference, a user can select a lens 1204, a lens 1212 with hood 1214, or other types of lenses for use with the lens system 1200.

Figure 25:
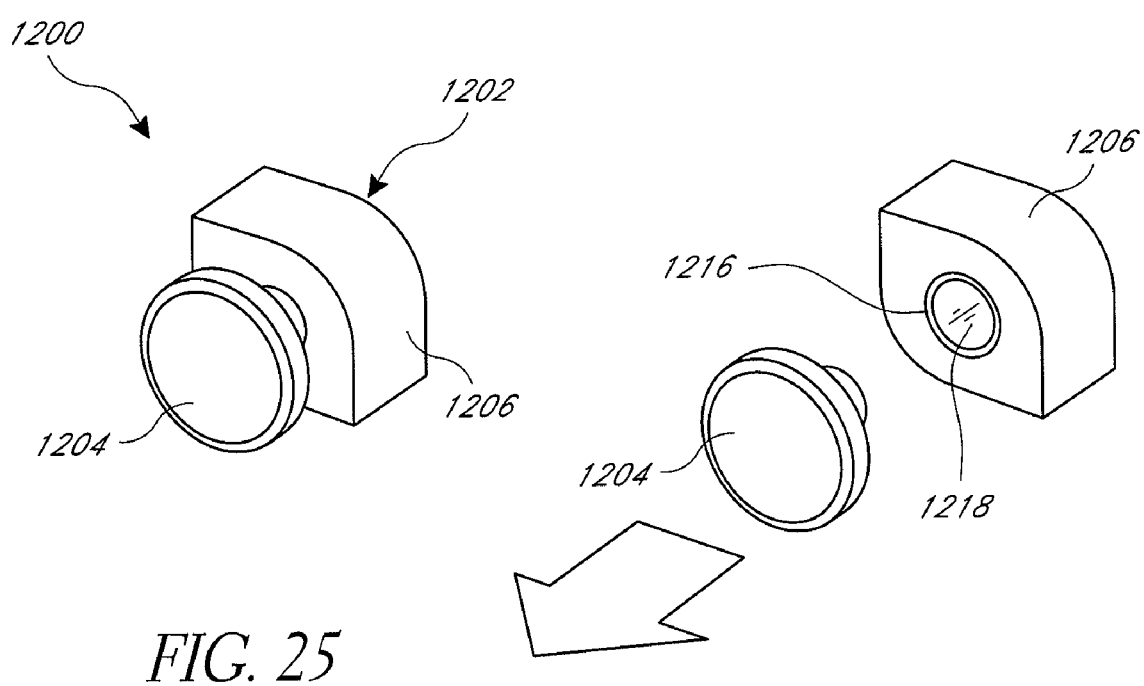
FIG. 25 illustrates an example of a lens system with an interior lens.

FIG. 25 illustrates an example of the lens system 1200 that includes one or more interior lens components. In some embodiments, the lens system 1200 can include an embedded lens component 1216. The retainer portion 1206 or the embedded lens component 1216 can comprise a connection portion, such as a threaded portion, that can be similar to the lens attachment portion 1208, described above. The threaded portion can facilitate removably attaching lenses, such as lens 1204, to the retainer portion 1206. In some embodiments, the retainer portion 1206 and/or the embedded lens component 1216 can include a lens 1218. As illustrated, the embedded lens component 1216 can be generally flush with or inset within the walls of the retainer portion 1206. In some embodiments, the lens 1218 can be a macro lens configured to magnify an image by at least about 4× magnification. Many different magnifications are possible. In some embodiments, the lens 1218 can be a macro lens configured to apply a magnification of at least about 5× magnification and/less than or equal to about 15× magnification, etc. In some embodiments, multiple lenses can be configured to provide a variable optical magnification (e.g., a zoom feature) by permitting manipulation of the distance between the lenses, such as with a lever or rotating actuator (e.g., a thumb wheel).

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention.

The following is claimed:

1. A lens component configured to be selectively attachable to a communication device in a region of the communication device near an onboard camera lens of the communication device, the lens component comprising:
    a retainer portion comprising two sidewalls forming a channel, the distance between the sidewalls generally corresponding to the thickness of a portion of a corner area of a communication device over which the retainer portion is configured to fit, each sidewall being configured to extend along two generally perpendicular edges of a communication device to secure the lens component to the communication device without requiring additional securing structure; and
    at least one lens attached to the retainer portion;
    wherein the lens is configured to modify an image of light received by an onboard camera lens.

2. The lens component of claim 1, wherein the distance between the sidewalls is slightly smaller than the thickness of the portion of the communication device to which the lens component is configured to attach.

3. The lens component of claim 1, wherein the two sidewalls have a curvilinear shape so as to inhibit obstruction of a view of a display screen on the communication device to which the lens component is configured to attach.

4. The lens component of claim 1, wherein the retainer portion comprises an upper wall extending between the two sidewalls, the upper wall having a curvilinear shape so as to compliment the shape of the corner area of the communication device to which the lens component is configured to attach.

5. The lens component of claim 1, wherein the lens component is not required to be attached to mounts that are attached to the communication device in order to be selectively secured to the communication device.

6. A lens component configured to be selectively attachable to a communication device such that light received by an onboard camera lens passes through the lens component before contacting the onboard camera lens, the lens component comprising:
    a retainer portion comprising a first sidewall and a second sidewall, the first and second sidewalls forming a channel, the distance between the first and second sidewalls configured to be generally complimentary to the thickness of a communication device over which the retainer portion is configured to fit, the retainer portion further comprising an upper wall extending between the first and second sidewalls, the upper wall contacting the communication device on two non-parallel sides; and at least one lens attached to the retainer portion, the lens being configured to modify an image of light received by an onboard camera lens, and the vertical and horizontal position of the lens being configured to be adjustable to generally match the location of the camera lens on the communication device.

7. The lens component of claim 6, wherein the upper wall contacts the communication device along two generally orthogonal edges of the communication device.

8. The lens component of claim 6, wherein at least one lens is removably attached to the retainer portion.

9. The lens component of claim 8, wherein the lens component is configured to removably attach to the communication device independent of at least one lens removably attaching to the retainer portion.

10. The lens component of claim 6, wherein at least one lens is a macro lens, telephoto lens, wide-angle lens, fish-eye lens, or microscopic lens.

11. The lens component of claim 6, further comprising a light enhancing component.

12. The lens component of claim 11, wherein the light enhancing component is a light pipe configured to convey light from a flash component of the communication device to an area in front of the communication device and in front of the lens component.

13. The lens component of claim 6, wherein at least one lens is adjustably attached to the retainer portion.

14. The lens component of claim 6, further comprising an attachment component configured to connect the lens component to a person-carried accessory.

15. The lens component of claim 6, further comprising a lens hood.

16. A method of manufacturing an auxiliary lens for a communication device for use in modifying light to be received by an onboard camera in the communication device, the method of manufacturing the auxiliary lens comprising:

providing a retainer comprising a first sidewall, a second sidewall, and an upper wall, the first and second sidewalls being substantially parallel to each other, the upper wall extending between the first and second sidewalls, and the distance between the first and second sidewalls generally corresponding to the thickness of an upper corner of a communication device to which the auxiliary lens is configured to attach, the retainer being configured to extend across less than the entire distance across an upper edge of a communication device when the retainer is attached to a communication device;

providing at least one lens attached or configured to attach to the retainer portion.

17. The method of claim 16, wherein attaching the lens to the retainer comprises removably attaching the lens to the retainer.

18. The method of claim 16, wherein attaching the lens to the retainer comprises permanently embedding the lens in the retainer.

19. The method of claim 18, further comprising providing a second lens and removably attaching the second lens to the retainer.

20. The method of claim 16, further comprising providing a light enhancing component and attaching the light enhancing component to the retainer.

* * * * *